United States Patent
Kokubo et al.

[11] Patent Number: 6,007,058
[45] Date of Patent: *Dec. 28, 1999

[54] MOUNTING COMPONENT FOR A CYLINDRICAL BUSHING AND A MOUNTING BODY

[75] Inventors: Sadao Kokubo, Ibarakiken; Masatoshi Enomoto; Shunta Ushioda, both of Tochigiken, all of Japan

[73] Assignees: Tokai Rubber Industries, Ltd., Aichi; Showa Aluminum Corporation, Osaka, both of Japan

[ * ] Notice: This patent is subject to a terminal disclaimer.

[21] Appl. No.: 08/841,997

[22] Filed: Apr. 22, 1997

[30] Foreign Application Priority Data

Apr. 23, 1996 [JP] Japan ................................. 8-100792
May 27, 1996 [JP] Japan ................................. 8-132310

[51] Int. Cl.⁶ .............................. F16F 5/00; F16M 12/00; B25G 3/00; B25G 3/28
[52] U.S. Cl. .................... 267/140.12; 403/344; 403/282; 248/634
[58] Field of Search ........................ 267/140.11, 140.12, 267/140.4, 276, 279, 292, 281, 284, 293; 248/638, 635, 634; 403/344, 282, 274

[56] References Cited

U.S. PATENT DOCUMENTS

| | | | |
|---|---|---|---|
| 4,083,580 | 4/1978 | Shaner | 267/276 |
| 4,349,954 | 9/1982 | Banks | 403/282 |
| 4,962,915 | 10/1990 | Thorn | 267/140.13 |
| 5,013,166 | 5/1991 | Domer | 267/276 |
| 5,261,749 | 11/1993 | Bennett et al. | 384/276 |
| 5,272,930 | 12/1993 | Nakamura et al. | 403/282 |
| 5,520,465 | 5/1996 | Kammel | 384/220 |
| 5,769,399 | 6/1998 | Fiedler | 267/140.12 |
| 5,857,659 | 1/1999 | Kato et al. | 248/634 |

*Primary Examiner*—Robert J. Oberleitner
*Assistant Examiner*—Robert A. Siconolfi

[57] ABSTRACT

The mounting component for a cylindrical bushing is comprised of a mounting portion for a bushing into which a cylindrical bushing can be fitted. The mounting portion for a bushing is a clamping-type mounting portion, comprised of a receptacle and a cover that is separate from the receptacle, and the aforementioned cylindrical bushing is inserted and clamped between them. The aforementioned receptacle is comprised of a hollow holder with an arcuate cross section that holds the aforementioned cylindrical bushing. On the holder, two protruding joints are provided. The aforementioned cover is comprised of a hollow holder with an arcuate cross section that holds the aforementioned cylindrical bushing. On the holder, joints corresponding to the joints of the aforementioned receptacle are provided. The cylindrical bushing is inserted into the holder of the aforementioned receptacle, and the aforementioned cover is placed with its holder lining with the cylindrical bushing, bonding the aforementioned corresponding joints by means of a coupling structure that uses a plastic deformation; thus the holders are maintained in a closed state and the cylindrical bushing is clamped.

4 Claims, 19 Drawing Sheets

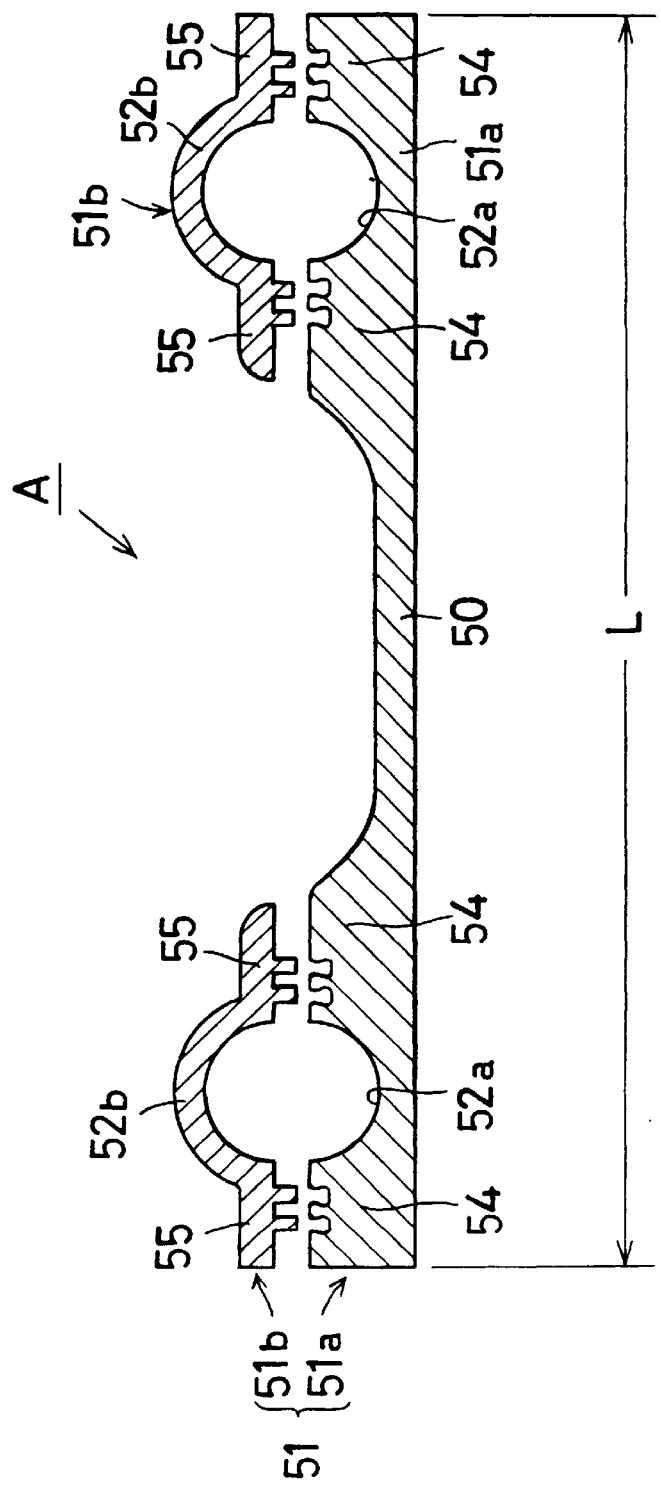

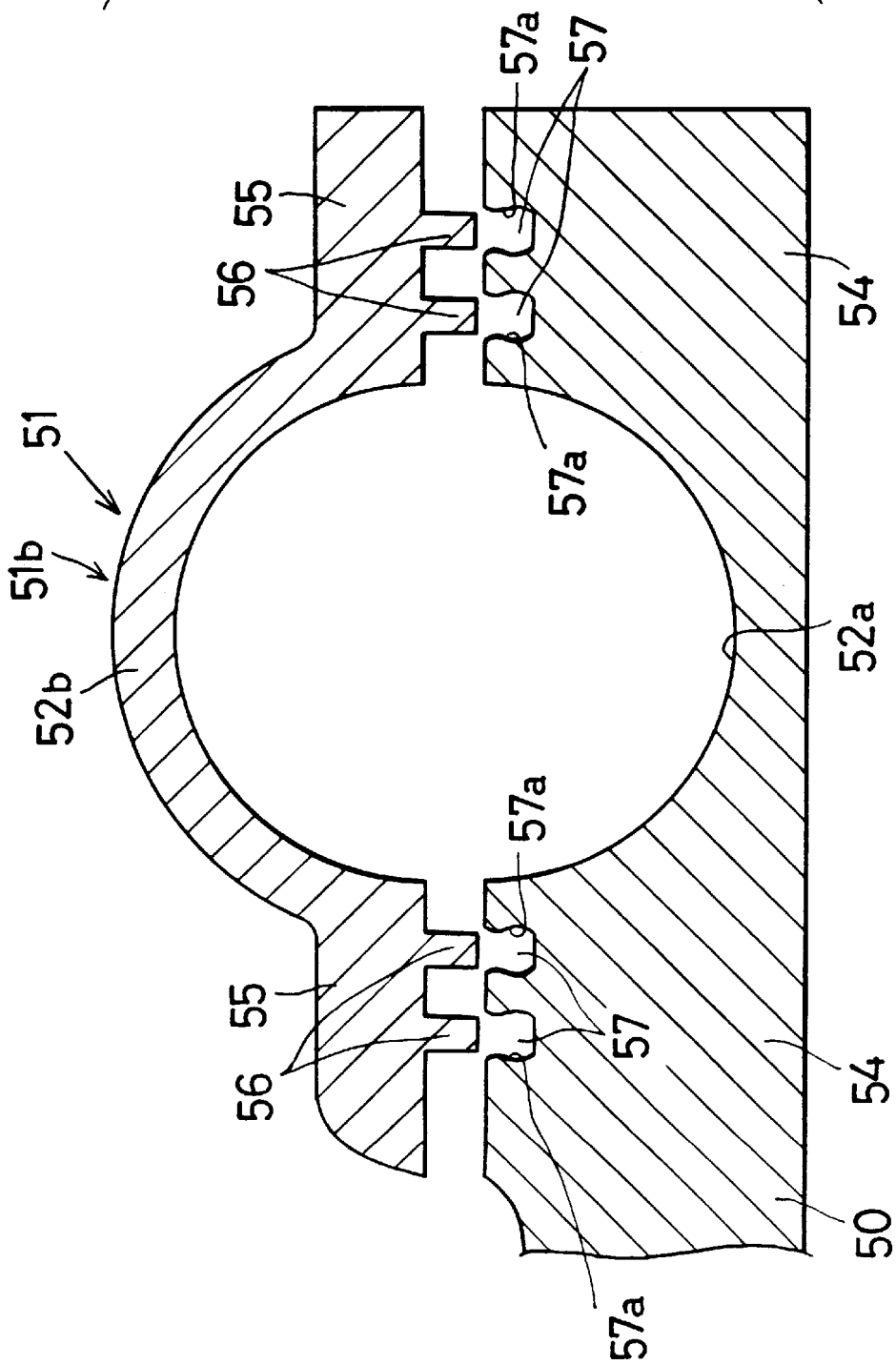

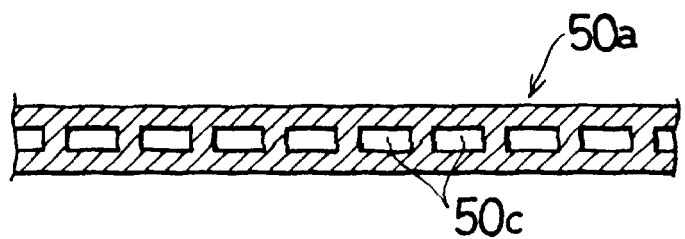
FIG. 20A
FIG. 20B
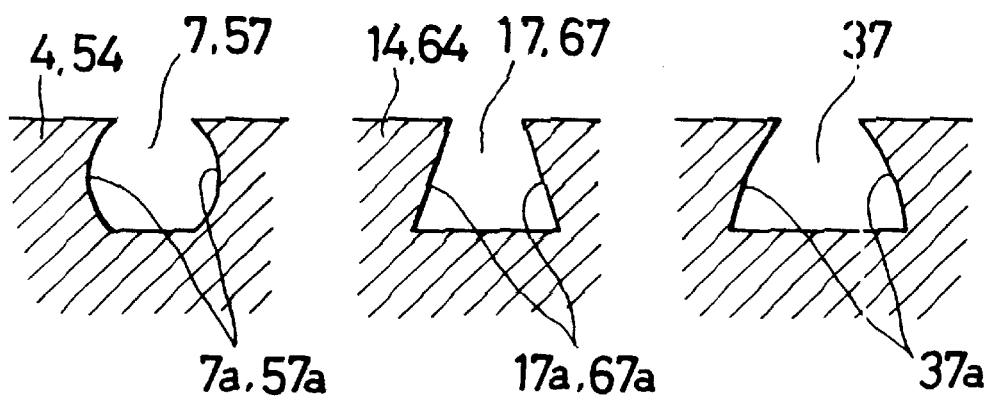
FIG. 21A  FIG. 21B  FIG. 21C
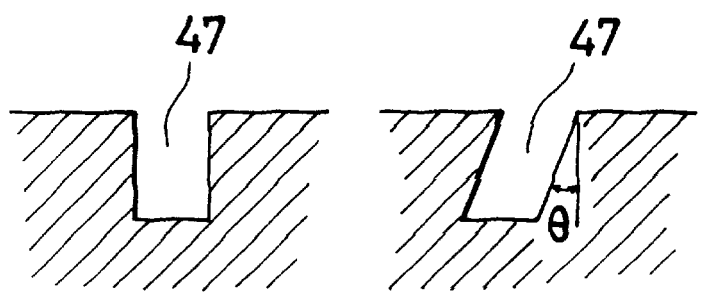
FIG. 22A  FIG. 22B

MOUNTING COMPONENT FOR A CYLINDRICAL BUSHING AND A MOUNTING BODY

FIELD OF TECHNOLOGY

This invention relates to a mounting component for a cylindrical bushing and to a mounting body having a cylindrical bushing attached as a mounting component used as anti-vibration mounts that support vibrating units such as automobile engines, or as automobile suspension arms such as upper arms, lower arms, and torsion bars.

For the purposes of the present Specification, the term aluminum refers to either aluminum or its alloy.

RELATED ART

Generally the aforementioned anti-vibration mounts and automobile suspension arms are composed of mounting bodies for bushing in which a cylindrical bushing is attached as a mounting component.

Previously press-fitted component for mounting bushings have been used almost exclusively. Such a press-fitted mounting body comprises an aluminum or other metallic mounting component or a synthetic resin mounting component that is comprised of a round holder, into which a cylindrical bushing is inserted. For a cylindrical bushing, an object is commonly used in which a center-positioned supporting axis is provided and a rigid sleeve is provided around the supporting axis such that the outer radius of the sleeve is slightly larger than the inner radius of the holder and they are connected by a rubber elastic body that is inserted between them. In such a configuration, the aforementioned rigid sleeve for the bushing is fitted and fixed to the mounting component by press-fitting the sleeve into the holder for the mounting component.

With such a press-fitted mounting body for a bushing as described above, an easy press-fitting operation and the tightness of the bushing and the mounting component that is achieved after press-fitting are mutually conflicting goals. This requires stringent size precision between the bushing and the mounting component and necessitates special processing in order to provide the required level of size precision on the inner circumference of the holder for the mounting component. In order to eliminate these drawbacks of the conventional mounting body for bushings, the present applicant has previously proposed a clamping-type mounting component for a bushing (Japanese Patent Application H7-165839 (1995)).

As shown in FIG. 24, the clamping-type component for mounting a bushing 101 is comprised of a holder 102 into which a cylindrical bushing is fitted. An opening 103 is created that extends in an axial direction at one location in the circumferential direction of the holder 102. At the opening 103 the holder 102 can be opened in a spanning manner. By enlarging the opening 103 and essentially increasing the inner circumference length of the holder 102, the bushing (not shown in the figure) is fitted into the holder 102 and a force is imposed in the direction in which the opening 103 closes in order to tightly attach the inner circumference surface of the holder to the outer circumference surface of the bushing, thus fitting and fixing the bushing in the holder 102.

The clamping-type component for mounting a bushing 101 permits easy insertion of the bushing into the holder 102 because the opening 103 enlarges. Subsequently, the mounting component 101 can be clamped around the outer circumference surface of the bushing in order to securely fit and fix the mounting component. In this manner, when compared with the conventional press-fitting method, the new clamping-type component for mounting a bushing can ease the size precision requirements of the space between the bushing and the holder 102, and thus offers the advantage of preventing the need for special machining for finishing the inner circumference surface of the holder for the mounting component to a high degree of size precision.

In the component for mounting a cylindrical bushing 101 of the above proposal, a protruding catch 104 is provided on one opening edge and a hook 105 is provided on the other opening edge, such that they are opposite to each other in a circumference direction, as an opening coupling structure to hold the mounting component on the outer circumference surface of the bushing in a clamped condition so that, in the clamped condition, the catch 104 and the hook 105 are fastened to each other.

However, fastening the catch 104 and the hook 105 to each other securely and in a non-detachable manner requires highly stringent size precision for the shapes and the geometry between the catch 104 and the hook 105, and thus presents a new problem of requiring somewhat cumbersome machining for the fabrication of these components. In addition, while this kind of clamping-type bracket 101 is commonly made by slicing an extruded material of a prescribed cross sectional shape in an axial direction, such an extrusion is difficult because of its near circular shape with a narrow opening 103, presenting yet another problem.

SUMMARY OF THE INVENTION

The present invention has been developed in view of this technological background. The purpose of the present invention is to provide a mounting component for a cylindrical bushing that is capable not only of easing the size precision requirements on the space between the bushing and the holder of the mounting component, but also of easing the size precision requirements of the coupling structure for a mounting component for a bushing, as well as fixing the bushing in the mounting component without deforming it, and is easy to manufacture.

Still another purpose of the present invention is to provide a component for mounting a bushing to which a bushing is attached to function as the aforementioned mounting component.

To accomplish the above objectives, the mounting component for a cylindrical bushing of the present invention basically incorporates the clamping method which clamps and fixes a bushing inserted between two components, a receptacle and a cover, and uses the plastic deformation property of the component as a coupling structure of the two components for fixing and holding the bushing.

Specifically, the present invention concerns a clamping-type mounting component comprising of a mounting portion for a bushing into which a cylindrical bushing is fitted. The aforementioned mounting portion has a receptacle and a cover which is separate from the receptacle, and the aforementioned cylindrical bushing is inserted and clamped in between them. Said receptacle has a holder that is hollow with an arcuate cross section such that it holds the aforementioned cylindrical bushing, and two protruding joints are provided. The aforementioned cover has a holder that is hollow with an arcuate cross section such that it holds the aforementioned cylindrical bushing, and protruding joints corresponding to the joints of the aforementioned receptacle are provided. The present invention is characterized in that a cylindrical bushing is fitted inside the holder of said receptacle and the aforementioned cover is placed such that its holder fits the cylindrical bushing and each of the aforementioned pair of joints are joined by means of a coupling structure that uses a plastic deformation, maintaining the holders in a closed state and clamping the cylindrical bushing.

Because the joints are coupled by using an appropriate plastic deformation, even when there are shape or size errors in the joints, it suffices to effect a plastic deformation so that those errors can be absorbed. Consequently this invention eliminates the necessity for stringent precision requirements. In addition, since two components are joined at two locations, stress applied onto a cylindrical bushing is small and even if compared with a conventional clamping method, thus a deformation at the time of tightening the bushing is controlled.

The following may be cited as a specific coupling structure: of the pair of joints of said mounting portion for a bushing, either one of the joints is provided with a flattened piece that protrudes toward the other joint, and a railcut recess having an expanding section, the opening area of which increases in the depth direction, is formed at the position on the other joint that corresponds to the flattened piece, and the joints are coupled when said flattened piece is inserted into the railcut recess and when the flattened piece is plastically deformed in such a way that it bites into the expanding section so that it cannot be withdrawn. In such a coupling structure the joints are directly connected to each other and a great bonding strength can be produced through the performance of an efficient bonding task.

The following may also be cited as another example of a bonding structure: either a flattened piece is constructed or a rail cut recess is created in each joint of said portion for mounting a bushing; a coupling device is placed between the joint, such that, on the coupling device, either a rail cut recess is created in correspondence to said flattened piece on the joint or a flattened piece is created in correspondence to said railcut recess on the joint; such that the rail cut recess possesses an expanding section the opening area of which increases in the depth direction; and such that the joints are connected by means of the coupling device either when the flattened piece of the one joint is inserted into the railcut recess of the coupling device and is plastically deformed in such a way that the flattened piece bites into the expanding section so that it cannot be withdrawn or when the flattened piece of the coupling device is inserted into the rail cut recess of the joint and is plastically deformed in such a way that the flattened piece bites into the expanding section so that it cannot be withdrawn. In this case, even if a size error occurs in the railcut recess or in the flattened piece that is provided in the joints, by adjusting the position of the railcut recess or the flattened piece that is provided in the coupling device, the error can be absorbed. In this manner the need for great exactitude in mounting component for bushing size precision can further be eliminated.

As still another example of a coupling structure, the case can be cited wherein the joints are joined in a superimposed condition when a part of the joints is deformed in a shearing direction. This eliminates the need for providing biting grooves or flattened pieces on a joint and can thus simplify the structure of and reduce the thickness of the cross sections of the joints.

Lightweight mounting component for bushings can be fabricated easily if the mounting component for bushing is formed by cutting an extruded shaped material of aluminum or its alloy to a prescribed thickness in an extruded direction.

Furthermore, mounting component for bushings substantially longer than the diameter of the extrusion die can be produced if the extruded shaped material, in its cross-section, has at least one arc-shaped on V-shaped curved corner such that the mounting component for bushing is made by cutting the extruded shaped material to a prescribed thickness in an extruded direction and then machining and expanding the corner in a straight line. This makes it possible to fabricate long mounting components without welding.

The following explanation is intended to further the readers understanding of other objectives, features, and advantages of the present invention.

BRIEF DESCRIPTION OF THE DRAWINGS

FIG. 4A is a lateral cross-sectional view of the receptacle and the cover of the mounting component for a bushing. FIG. 4B is a lateral cross-sectional view of a coupling body.

FIG. 9 is a lateral cross-sectional view of the component for mounting a bushing of the fourth embodiment mode of the present invention.

FIG. 10 is a partial, enlarged view of FIG. 9.

FIG. 20 is a lateral cross-sectional view of a component that contains a hollow area. In FIG. 20A, the hollow area has a harmonica shape. In FIG. 20B, the hollow area has a truss shape.

FIG. 21 shows lateral cross-sectional views of various rail cut recesses. In FIG. 21A, the railcut recess is curved and possesses an enlarged section at the mid-point in the depth direction. FIG. 21B shows a dovetail groove in which the enlarged section occupies the entire lateral side. In FIG. 21C, the railcut recess is curved and the enlarged section occupies the entire lateral side.

FIGS. 22A and 22B are lateral cross-sectional views of railcut recesses.

DETAILED DESCRIPTION OF THE PREFERRED EMBODIMENTS

[Embodiment Mode 1]

Figure 1:
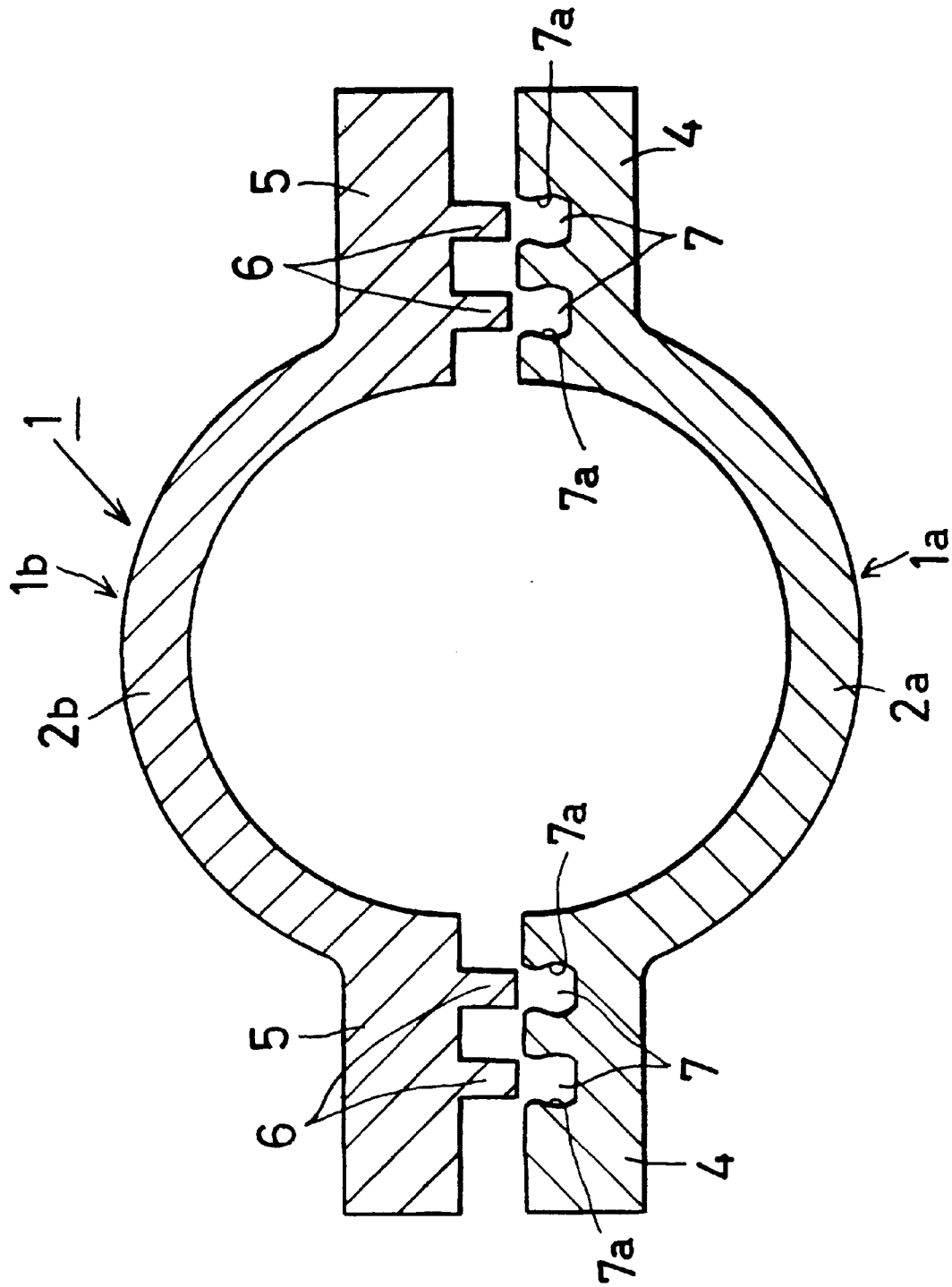
FIG. 1 shows the first embodiment mode of the present invention; it is a lateral cross-sectional view of the mounting component for bushing.
Figure 2:
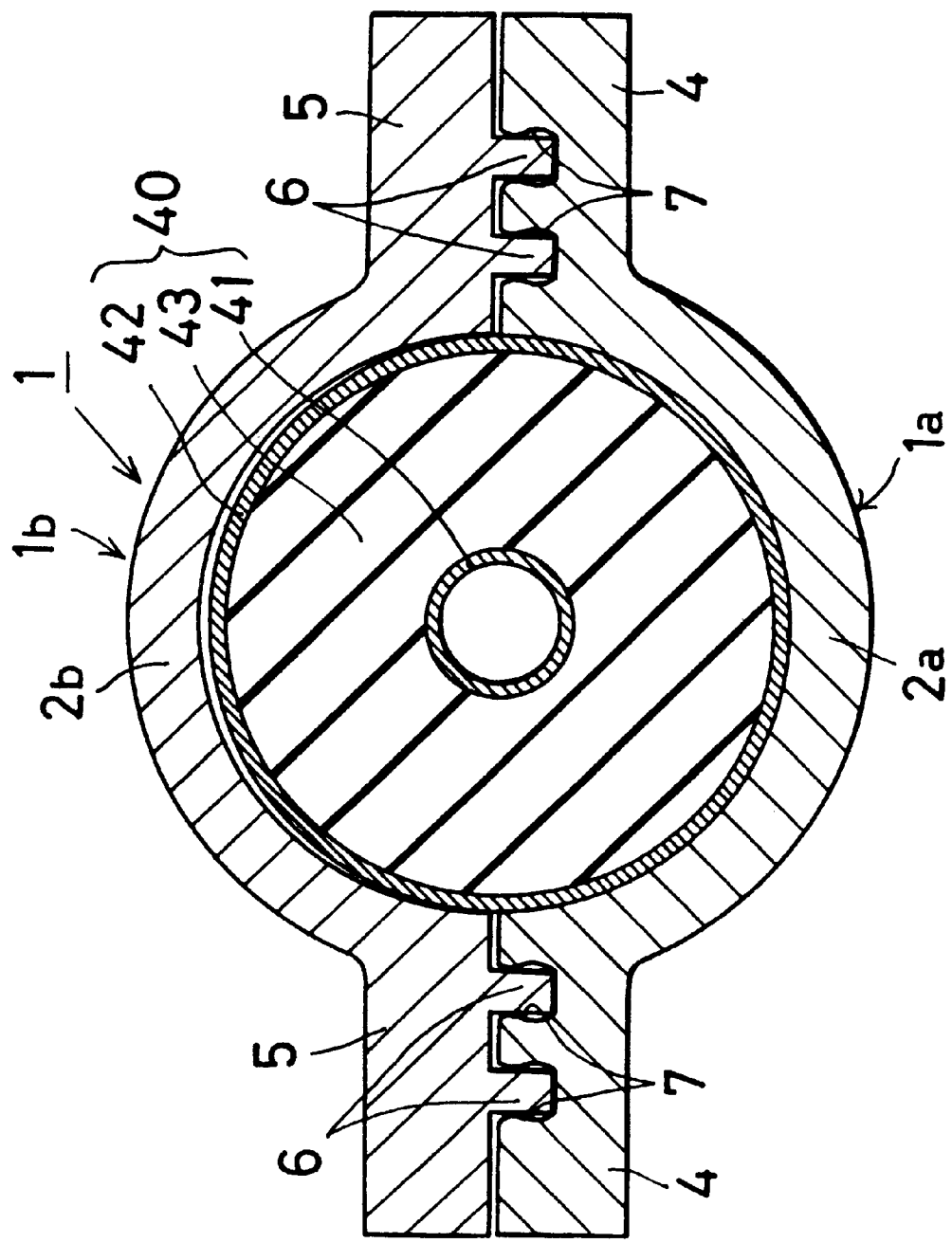
FIG. 2 is a lateral cross-sectional view of the mounting component for a bushing of FIG. 1 that shows the joints being connected after the bushing is mounted.
Figure 3:
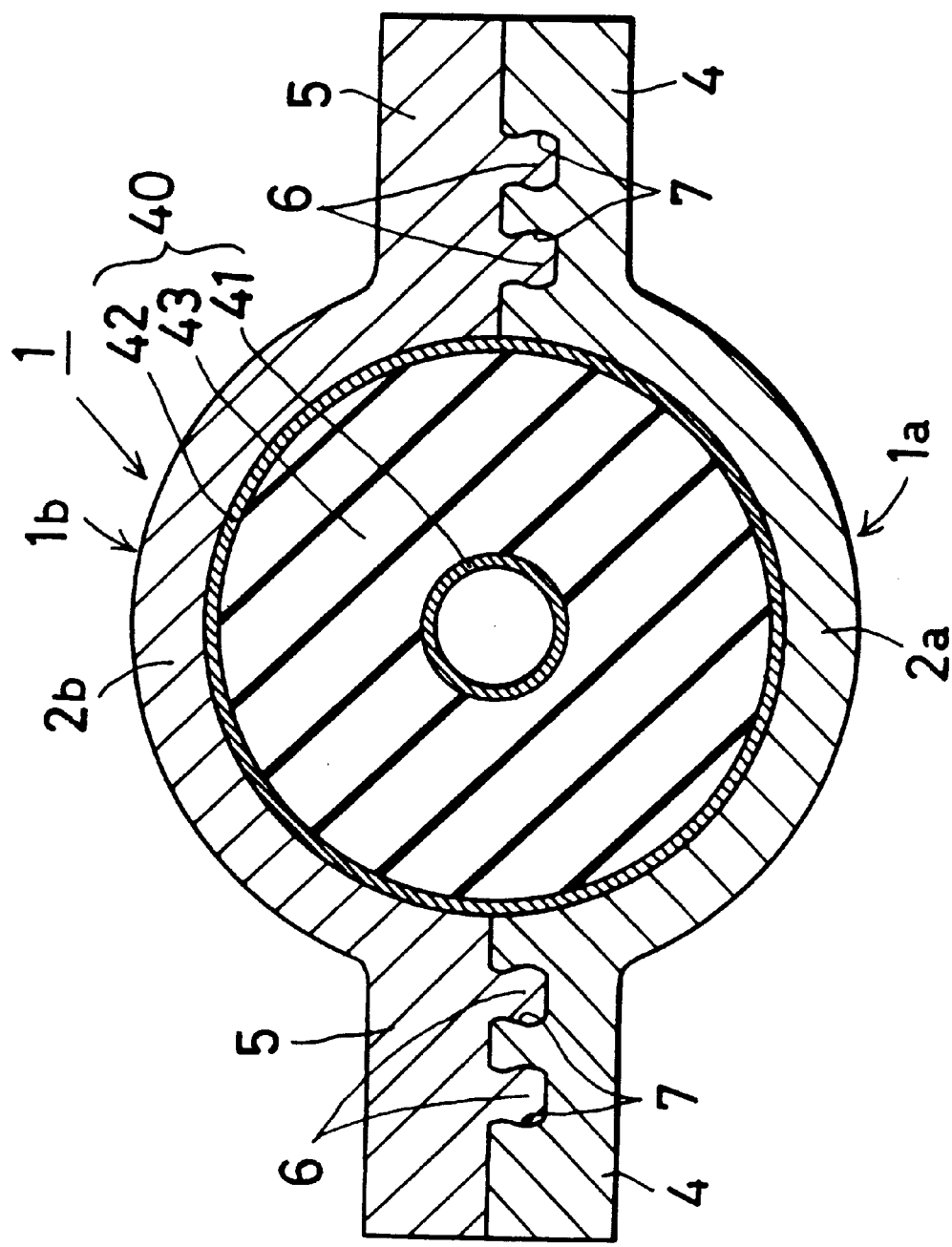
FIG. 3 is a lateral cross-sectional view that shows how the joints are connected.

FIGS. 1–3 show the first embodiment mode of the present invention as applied to an automobile engine-mounting bracket.

In these figures, 1 denotes a mounting component for bushing as a bracket as well as a portion for mounting a bushing, comprising of two pieces, a receptacle 1a and a cover 1b that is separate from this receptacle 1a; these components 1a, 1b are made by cutting an aluminum extruded shaped material into a specified length in the axial direction.

The aforementioned receptacle 1a is comprised of a curved holder 2a with a semicircular cross section into which a cylindrical anti-vibration bushing is fitted. On the open edges of said holder 2a, joints 4, 4 are formed throughout the entire area in an axial direction (direction of the thickness of the paper in FIG. 1), protruding outward in a radial direction of said holder 2a.

On the other hand, the cover 1b is comprised of a curved holder 2b with a semicircular cross section. On the open edges of said holder 2b, joints 5, 5 in correspondence to the joints 4, 4 of the aforementioned receptacle 1a are provided throughout the entire area in an axial direction, protruding outward in a radial direction.

At the joint 5 of the aforementioned cover 1b at opposite side of the receptacle 1a, a flattened piece 6 with a square cross section that extends in an axial direction in two inner and outer columns is provided. At the joint 4 of the aforementioned receptacle 1a at opposite side of the cover 1b, a biting groove 7 that extends in an axial direction in two inner and outer column is formed in a position corresponding to the aforementioned flattened piece 6. The flattened piece 6 and the biting groove 7 serve to couple the joints 4, 5, and thus holds the holders 2a, 2b in a closed condition. This is done by packing the aforementioned flattened piece 6 into the biting groove 7 by plastically deforming the former. For this purpose, the biting groove 7 contains an enlarged section 7a at the mid-point in the depth direction such that the groove is wider at the mid-point than at the upper or lower ends. Likewise, the flattened piece 6 is set so that the height of its protrusion is greater than the depth of the dovetail groove 7 and the lateral cross-sectional area of the flattened piece is set approximately equal to that of the dovetail groove 7. When the component for mounting a bushing 1 is closed, the deformed and inserted flattened piece 6 bites deeply enough into said enlarged section 7a to completely prevent the joints 4, 5 from separating.

The following explains how the mounting component for a bushing 1 shown in this embodiment mode is used to maintain a cylindrical anti-vibration bushing 40.

First, a cylindrical anti-vibration bushing 40 is inserted into a holder 2a of a receptacle 1a, while the aforementioned cover 1b is detached. In this embodiment mode a solid-type bushing 40 is used. In this bushing a center-positioned axial support component 41 and a cylindrical rigid sleeve 42 that is provided around the axial support component 41 are connected by a rubber elastic body 43, which is inserted between them. The outer diameter of the rigid sleeve 42 is set so that it is slightly larger than the inner diameter of a hole that is formed when the holders 2a, 2b of the receptacle 1a and the cover 1b are closed. However, since the upper part of the holder 2a of the receptacle 1a is open, the bushing 40 can easily be inserted into the holder 2a.

Then, the aforementioned cover 1b is placed with the holder 2b of said cover 1b lining with the cylindrical anti-vibration bushing 40 and the flattened groove in a corresponding position to the biting groove. When the joints 4, 5 are pressed by means of a press so that they come close to each other in order to close the mounting component for bushing, the tip of the flattened piece 6 abuts the bottom of the biting groove 7 before the receptacle la and the cover 1b of the mounting component for bushing 1 are closed, as shown in FIG. 2. When the joints 4, 5 are further pressed in this condition so that they are tightly attached, the flattened piece 6 is plastically deformed in a pressure-squeezed manner in conformance with the shape of the biting groove 7 as shown in FIG. 3. This causes the flattened piece 6 to be inserted into the biting groove 7 that includes the enlarged section 7a. The opposite sides of the joints 4, 5 come closer to each other in a direction of tight attachment, and both holders 2a, 2b of the receptacle 1a and the cover 1b become completely closed. At the same time, the inner circumference surface of the holders 2a, 2b of the mounting component for bushing 1 tightly attaches to the outer circumference surface of the cylindrical anti-vibration bushing 40, and thus the cylindrical anti-vibration bushing 40 becomes securely clamped.

Even when the pressure on the joints 4, 5 is released in this state, the flattened piece 6, which has been deformed and inserted into the biting groove 7, has bitten deeply enough into the enlarged section 7a of the biting groove to completely prevent the joints 4, 5, that is, the receptacle 1a and the cover 1b, from separating. In this manner the clamped and secured condition inside the holders 2a, 2b of the cylindrical anti-vibration bushing 40 is maintained.

The component for mounting a bushing fabricated in this manner as an anti-vibration mount can be attached to the target component by means of both joints 4, 5 of the mounting component for bushing 1. It should be noted that, in order to attach the component for mounting a bushing to a target component, one of the joints 4, 5 can be extended in an outer radial direction. Alternatively, an attachment component can be provided on the outer circumference surface of the mounting component, separate from the joint.

While in this embodiment mode a biting groove 7 is provided at a receptacle 1a and a flattened piece 6 is formed at a cover 1b in a component for mounting a bushing, it is possible to reverse the constitution so that a flattened piece is provided at the receptacle and a biting groove at the cover. It should also be noted that the flattened piece 6 does not need to be inserted into the entire interior of the biting groove 7. It suffices that the flattened piece 6 is plastically deformed and bites into the enlarged section 7a of the biting groove 7 so that the flattened piece 6 is prevented from dislodging from the biting groove.

[Embodiment Mode 2]

Figure 4:
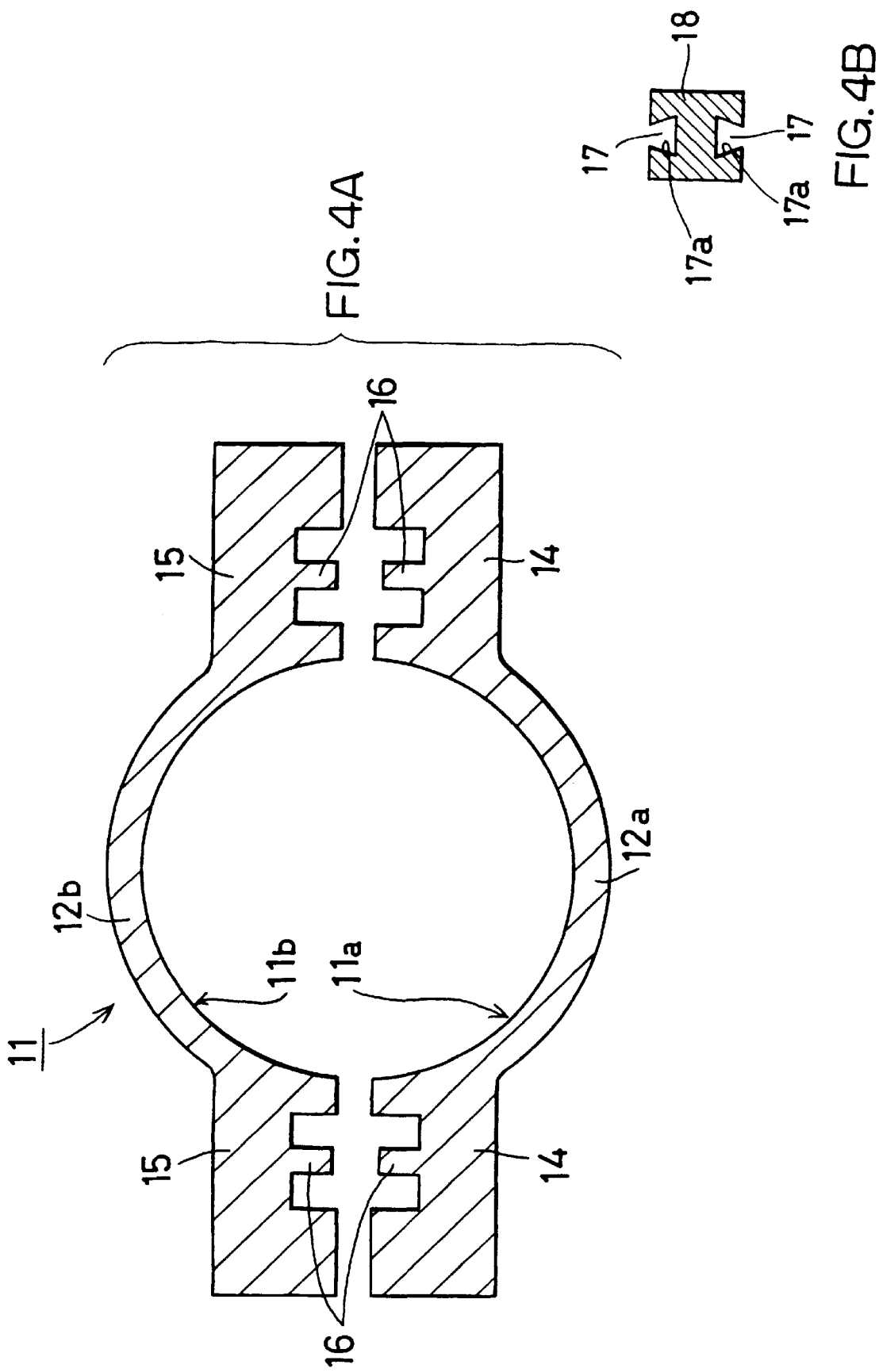
FIG. 4 shows the second embodiment mode of the present invention.
Figure 5:
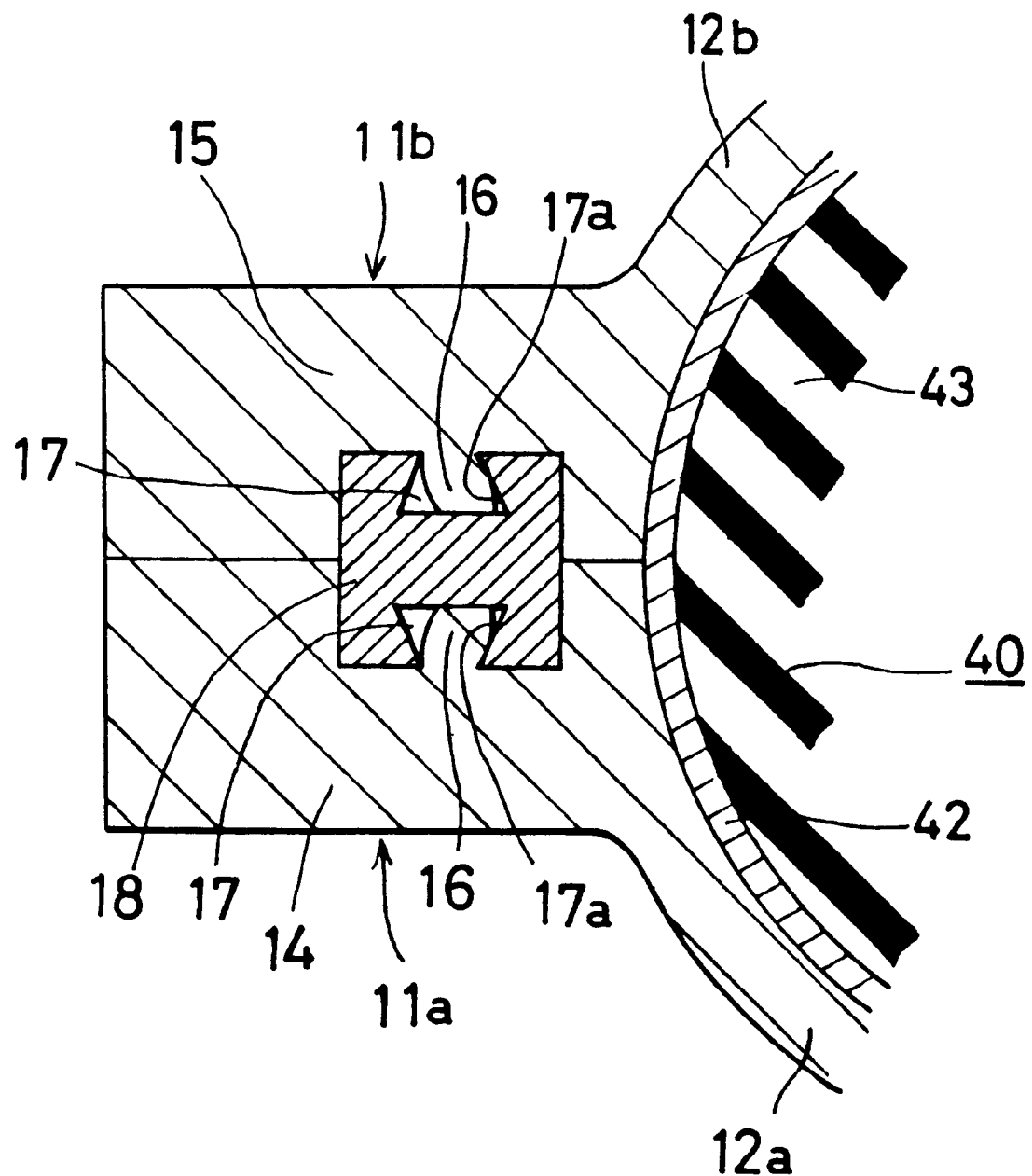
FIG. 5 is an enlarged lateral cross-sectional view that shows the joints being connected after a cylindrical anti-vibration bushing is inserted into the mounting component for a bushing of FIG. 4.

FIGS. 4 and 5 show the second embodiment mode of the present invention that is applied to an automobile engine-mounting bracket. This embodiment mode entails connecting both of the joints for a mounting component by means of a coupling body made of aluminum.

In these figures, 11 denotes a component for mounting a bushing as the aforementioned automobile engine-mounting bracket, as well as a portion for mounting a bushing. If compared with what is shown in FIGS. 1–3, it has the same constitution as the holders 12a, 12b of the receptacle and the cover 11b, while the coupling structure of these 11a, 11b differs.

The aforementioned component for mounting a bushing 11 connects both joints 14, 15 by means of a coupling body 18, and is comprised of three pieces, a receptacle 11a, cover 11b and a coupling body 18. These components 11a, 11b, 18 are manufactured by cutting an extruded shaped material of a cross sectional shape, each shown in FIG. 4A and FIG. 4B, into a prescribed thickness in an axial direction.

In the aforementioned receptacle 11a and the aforementioned cover 11b shown in FIG. 4A, on the open edges of each of the holder 12a, 12b, a pair of joints 14, 15 are provided, protruding on the outer circumference surface over the entire axial direction area. On each of the opposite sides of the joints 14, 15, a flattened piece 16 with a square cross section that extends in an axial direction is provided at the center part in a radial direction. On the other hand, 18 shown in FIG. 4B is a coupling body. The coupling body 18 is formed with a rectangular cross section that has almost the same length and width as the opposite faces of the joints 14, 15. On the two sides of the coupling body 18 that face the aforementioned joints 14 15, the aforementioned biting grooves 17 are formed extending in an axial direction in a position corresponding to the aforementioned flattened piece 16. The flattened piece 16 and the biting grooves 17 serve to couple the joints 14, 15 through the coupling body 18, and thus hold the holders 12a, 12b of the receptacle 11a and the cover 11b in a closed condition. This is done by. packing the aforementioned flattened piece 16 into the biting grooves 17 by plastically deforming the former. For this purpose, the biting groove 17 contains an enlarged section 17a at the mid-point in the depth direction such that the width of the groove increases continuously (the area of the opening increases) in a dovetail groove manner from the top toward the bottom. Likewise, the flattened piece 16 is set so that the height of its protrusion is greater than the depth of the biting groove 17. When the component for mounting a bushing 11 is closed, the deformed and inserted flattened piece 16 bites into the enlarged section 17a to. strongly prevent the joints 14, 15 from separating. Moreover, the height of the coupling body 18 is set so that, when the component for mounting a bushing 11 is closed, the opposite sides of the coupling body 18 and the joints 14, 15 are tightly attached to each other.

The following explains how the cylindrical anti-vibration bushing 40 is maintained by the component for mounting a bushing 11 in this embodiment mode.

First, a cylindrical anti-vibration bushing 40 is inserted into a holder 12a of a receptacle 11a, while the aforementioned cover 11b is detached. Said coupling body 18 is placed so that the flattened piece 16 of the receptacle 11a is in a position corresponding to the biting groove 17 of the aforementioned coupling body 18.

Then, the cover 11b is placed onto the receptacle 11a with its holder 12b lining with the cylindrical anti-vibration bushing 40 and the flattened piece 16 in a corresponding position to the biting groove 17. When the joints 14, 15 are pressed by means of a press so that they come close to each other in order to close the mounting component for bushing 11, each of the flattened pieces 16 of the joints is fitted into each of the biting grooves 17 of the coupling body 18; the tip of the flattened piece 16 abuts the bottom of the biting groove 17. When the joints 14, 15 are further pressed in this condition so that they are tightly attached, the flattened piece 16 is plastically deformed in a pressure-squeezed manner in conformance with the shape of the biting groove 17. This causes the flattened piece 16 to be inserted into the biting groove 17 that includes the enlarged section 17a as shown in FIG. 5. The opposite sides of the joints 14, 15 come closer to each other in a direction of tight attachment, and both holders 12a, 12b of the receptacle 11a and the cover 11b become completely closed. At the same time, the inner circumference surface of the holders 12a, 12b of the mounting component for bushing 11 tightly attaches to the outer circumference surface of the cylindrical anti-vibration bushing 40; thus the cylindrical anti-vibration bushing 40 becomes securely clamped and the mounting body for a bushing of the present invention is formed.

Even when the pressure on the joints 14, 15 is released in this state, the flattened piece 16, which has been deformed and inserted into the biting groove 17, has bitten into the enlarged section 17a of the biting groove to completely prevent the joints 14, 15. In this manner the clamped and secured condition inside the holders 12a, 12b of the cylindrical anti-vibration bushing 40 is maintained.

This embodiment mode provides flattened pieces 16 in the joints 14, 15 and biting grooves 17 in the coupling body 18. However, alternatively, biting grooves may be provided in the joints 14, 15 and flattened pieces in the coupling body 18. Also, a flattened piece may be provided in one joint, and a biting groove on the other joint, while corresponding biting groove and flattened piece are formed in the coupling body. Furthermore, the flattened piece 16 may be plastically deformed so that it completely fills the biting groove 17.

Although the first and the second embodiment modes describe situations where biting grooves 57, 67 are provided over the entire axial direction of the component for mounting a bushing (mounting portion for a bushing) 1, 11 as biting recesses into which flattened pieces 6 and 16 bite, it is not necessary that the biting grooves be provided over the entire axial direction of the mounting component for a bushing 51, 61. Alternatively, biting recesses may be formed as one or more through or non-through biting hole (biting holes).

[Embodiment Mode 3]

Figure 6:
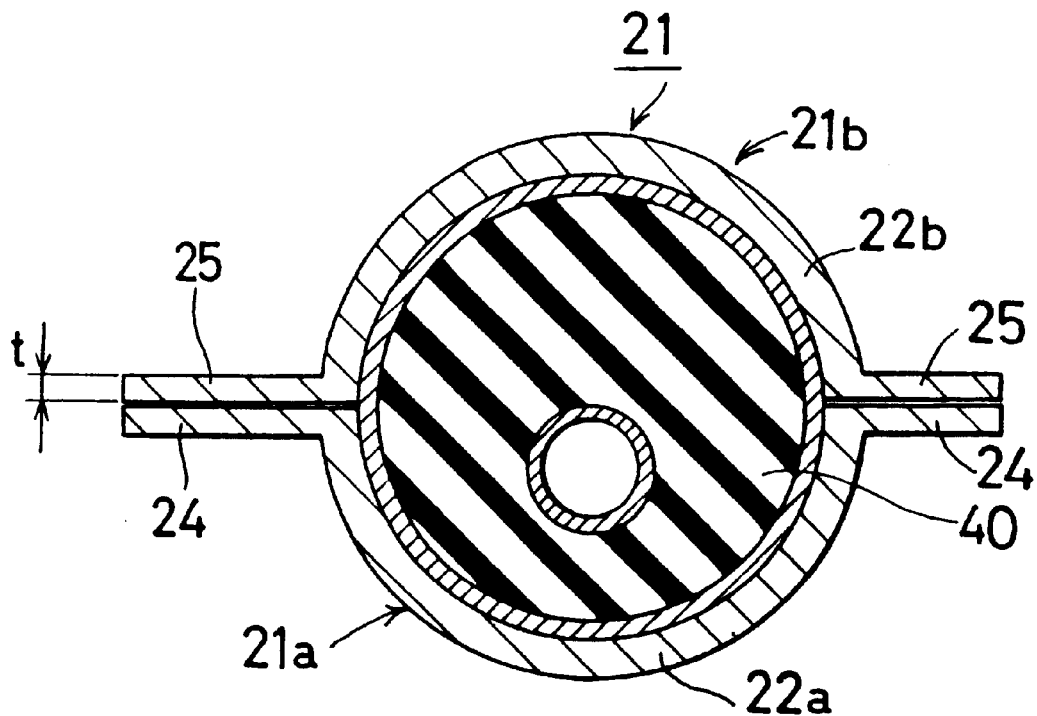
FIG. 6 shows a third embodiment mode of the present invention; it is a lateral cross-sectional view that shows the receptacle and the cover fitted after a cylindrical bushing is inserted into the mounting component for a bushing.
Figure 7:
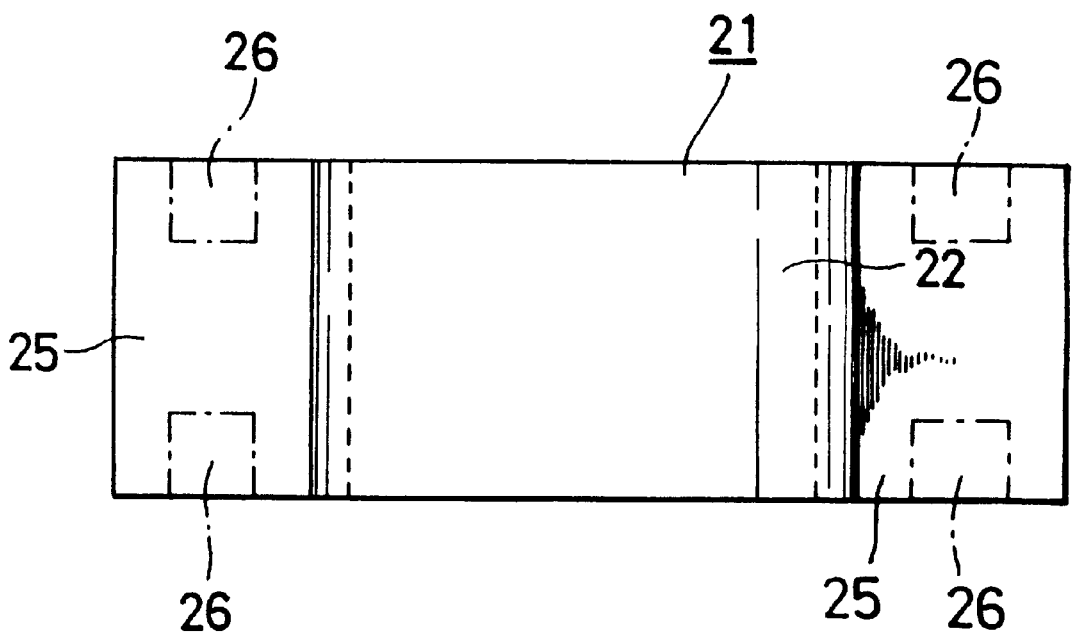
FIG. 7 is a planar view of FIG. 6.

FIGS. 6–8 show yet another embodiment mode of the present invention that is applied to an automobile engine-mounting bracket. This embodiment mode adopts shearing bonding as a bonding structure by means of the plastic deformation of joints.

In these figures, 21 denotes a component for mounting a bushing 21 as a mounting bracket as well as a portion for mounting a bushing. It has the overall configuration that parallels the one shown in the first embodiment mode, being comprised of two pieces, a receptacle 21a and a cover 21b; each of these components is made by cutting an aluminum extruded shaped material of cross sectional shape into a specified length in the axial direction as shown in FIG. 6.

Each of the aforementioned receptacle 21a and the cover 21b possesses a curved holder 22a, 22b with a semicircular cross section. On the open edges of each of said holders 22a, 22b, joints 24, 25 are provided, which are relatively thin, throughout the entire area in an axial direction, protruding outward in a diameter direction of said holders 22a, 22b.

In the component for mounting a bushing 21, a cylindrical anti-vibration bushing 40 is inserted into the holder 22a of the receptacle 21a while the cover 21b is detached. Then the cover 21b is placed so that the holder 22b is lined with the aforementioned cylindrical anti-vibration bushing 40, coupling the joints 24, 25.

Figure 8A:
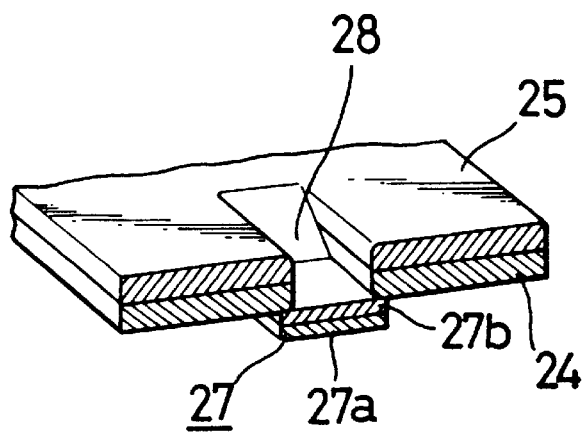
FIG. 8A is a perspective view that shows the plastic deformation of a joint of the component for mounting a bushing by a shearing force.
Figure 8C:
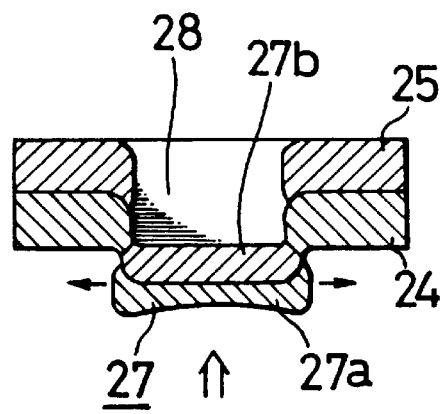
FIG. 8C is a lateral cross-sectional view that shows the area around the deformed part after the deformed part has been pressed.
Figure 8B:
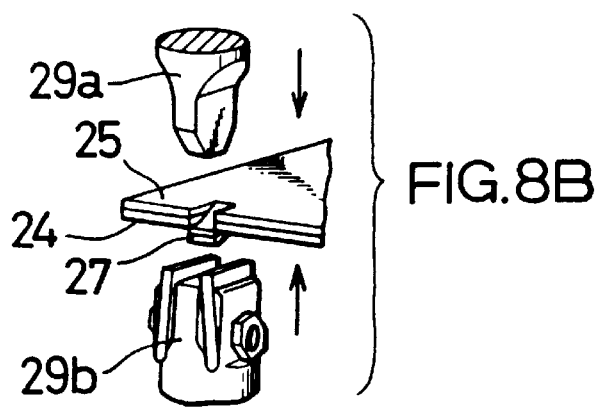
FIG. 8B is a perspective view that shows the condition of the deformed part after it is deformed and before it is pressed.

In the next step, a plastic deformation force in the direction of height (direction of the superimposition), that is, a shearing force, is applied to the site to be deformed 26 (indicated by the dotted lines in FIG. 7) on the joints 24, 25 that are superimposed. This is shown in FIG. 8A. The deforming is performed so that, as shown in FIG. 8C, a part of the thickness of the joint 25 in the backward direction of the shearing force (the upper parts in FIGS. 6 and 8) will slightly remain in the sheared hole 28 that is created by the shearing operation. Subsequently, the deformed section 27 is pressed in the direction of thickness by means of a shearing punch 29a and an anvil 29b that is provided in the lower mold as shown in FIG. 8B. As shown in FIG. 8C, this increases the radial direction width of the joint 27b in the backward shearing direction (the upper part) of the deformed section 27a. This causes the deformed section to bite into the sidewall of the shearing hole 28. On the other hand, the burr for the joint 27a in the forward shearing direction (the lower part) is increased in order to make the width in the radial direction larger than the width of the shearing hole 28 so that the joint will not be dislodged in a direction opposite the shearing direction. This increases the bonding force of the joints 24, 25 so that the bushing 40 is securely clamped and locked in the holders 22a, 22b.

In such a shearing bonding structure, there are no particular restrictions on the size or position of the shearing deformed section 27. These factors, however, should be set so that enough bonding power is generated to prevent the occurrence of any gap between the joints. Furthermore, thickness t of the joints 24, 25 should be determined appropriately by taking the rigidity and the shearing load on the joints into consideration.

[Embodiment Mode 4]

FIGS. 9–12 show the fourth embodiment mode of the present invention that is applied to an automobile suspension arm.

In these figures, A denotes a component for mounting a bushing used as an automobile suspension arm component, comprising of a component body of a square column shape 50 and two covers 51b, 51b. The component body 50 and the covers 51b, 51b are made by cutting an aluminum extruded shaped material having the cross-section shape shown in FIG. 9 into a specified length in an axial direction.

The aforementioned component body 50 constitutes a main piece of the component for mounting a bushing A, and at the two ends in the direction of its length, along with the aforementioned covers 51b, 51b, receptacles 51a, 51a are provided in an integrated manner so as to form a portion for mounting a bushing 51 into which a cylindrical anti-vibration bushing 40 is fitted. The receptacle 51a is formed so that it is thicker than the component body 50 in the height direction, and is comprised of a hollow holder 52a with a semicircular cross section into which a cylindrical anti-vibration bushing 40 is inserted. On both open edges of said holder 52a, a pair of joints 54, 54 are provided in the entire area in the axial direction (direction of the thickness of the paper in FIG. 9), providing outward in the radial direction of said holder 52a. One of the joints 54, 54 that is on an inner side becomes continuously thinner in the height direction from the center part toward the side of the component body 50, until it is of the same thickness as the component body 50 and is integrated with the component body 50.

On the other hand, the two covers 51b, 51b of the portion for mounting a bushing 51 are separate from the aforementioned receptacle 51a, and are comprised of a curved holder 52b with a semicircular cross section. On both open edges of said holder 52b, a pair of joints 55, 55 are provided in the entire area in the axial direction in correspondence to the joints 54, 54 of the aforementioned receptacle 51a, protruding outward in the radial direction of said holder 52b.

In the joint 55 of the aforementioned cover 51b, as shown in details in FIG. 10, flattened pieces 56 with a square cross section are provided that extend in an axial direction in two inner and outer columns at the positions opposite the receptacle 51a. At the joint 54 of the receptacle 51a, on the opposite side from the cover 51b, in corresponding positions to the aforementioned flattened pieces 56, biting grooves 57 are provided extending in an axial direction in two inner and outer columns. The flattened pieces 56 and the biting grooves 57 serve to couple the joints 54, 55, and thus hold the holders 52a, 52b in a closed condition. This is done by packing the aforementioned flattened piece 56 into the biting groove 57 by plastically deforming the former. For this purpose, the biting groove 57 contains an enlarged section 57a at the mid-point in the depth direction with a large opening area, such that the groove is wider at the mid-point than at the upper or lower end. Likewise, the flattened piece 56 is set so that the height of its protrusion is greater than the depth of the biting groove 57 and the lateral cross-sectional area of the flattened piece is set approximately equal to that of the biting groove 57. When the portion for mounting a bushing 51 is closed, deformed and inserted flattened piece 56 bites into said enlarged section 57a deeply enough to strongly prevent the joints 54, 55 from separating.

The following explains how the bushing is held by the component for mounting a bushing A of the present embodiment mode.

First, a cylindrical anti-vibration bushing 40 is inserted into a holder 52a of a receptacle 51a, while a cover 51b is detached. In this embodiment mode a solid-type cylindrical bushing 40 is used. In this bushing a center-positioned axial support component 41 and a cylindrical rigid sleeve 42 that is provided around the axial support component 41 are connected by a rubber elastic body 43, which is inserted between them. The outer diameter of the rigid sleeve 42 is set so that it is slightly larger than the inner diameter of a hole that is formed when the holders 52a, 52b of the receptacle 51a and the cover 51b are closed. However, since the upper part of the holder 52a of the receptacle 51a is open, the bushing 40 can easily be inserted into the holder 52a.

Figure 11:
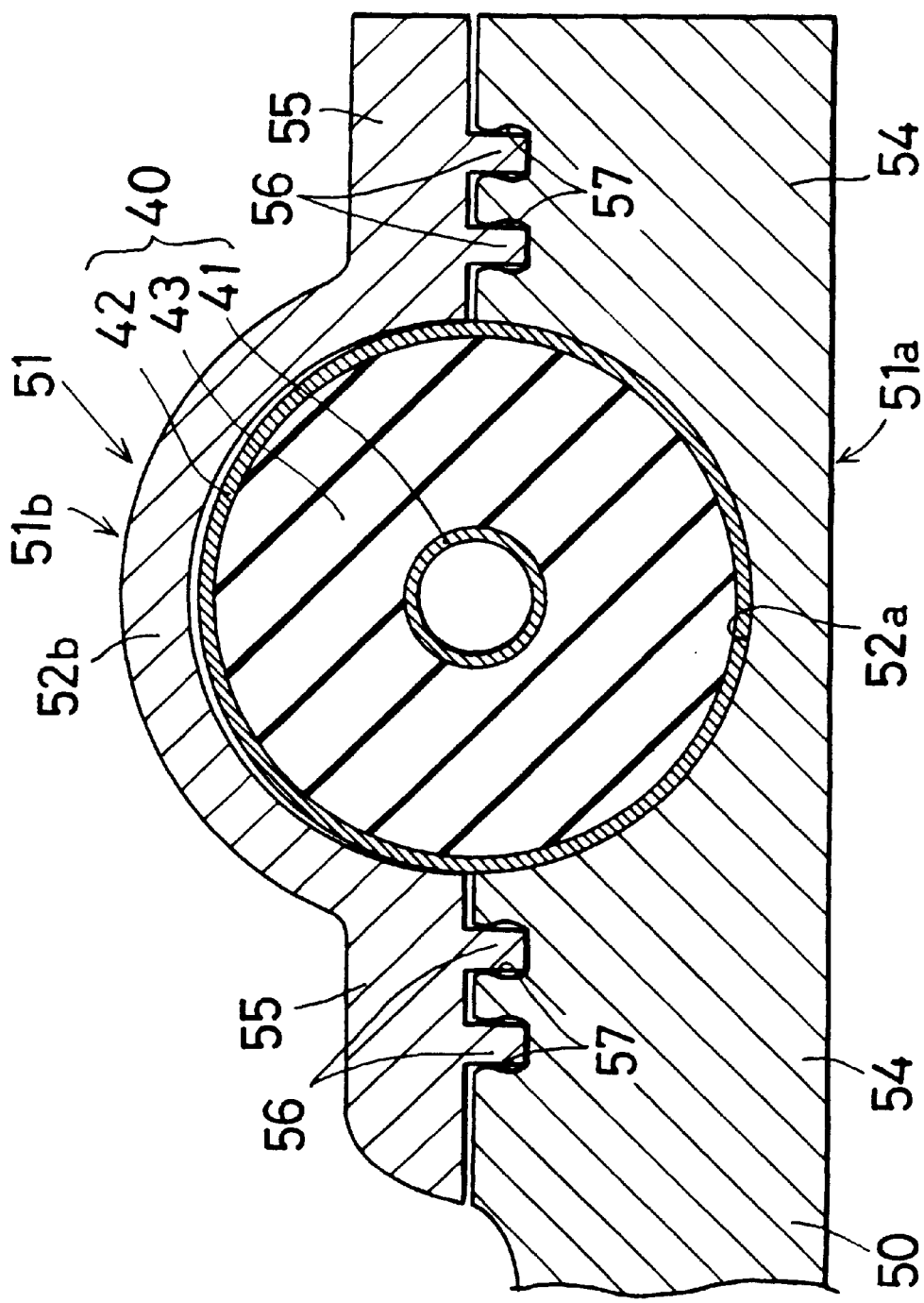
FIG. 11 is a lateral cross-sectional view of the portion for mounting a bushing being closed after a cylindrical bushing is inserted into the component for mounting a bushing of FIG. 9.
Figure 12:
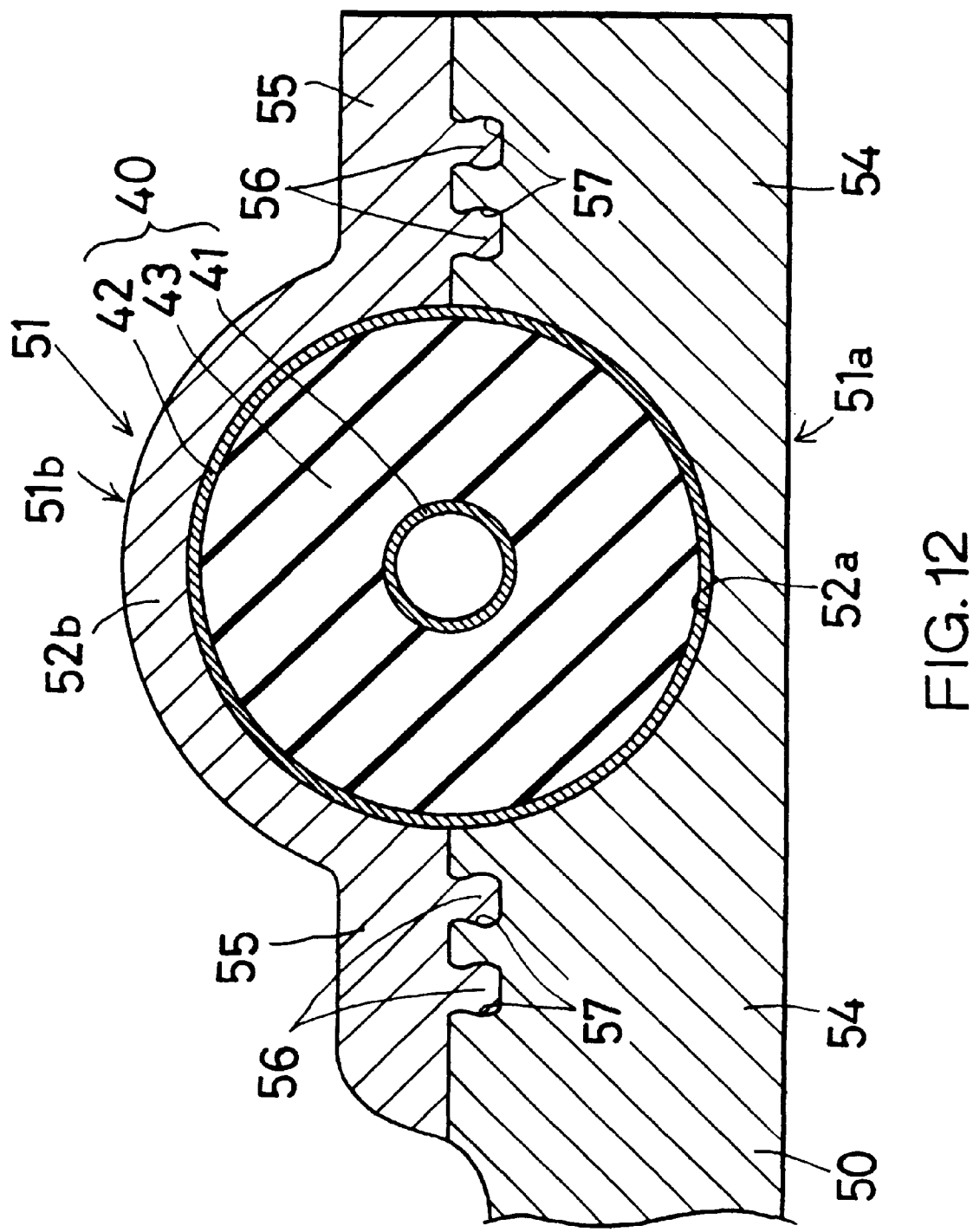
FIG. 12 is an enlarged lateral cross-sectional view that shows how the joints are connected in the component for mounting a bushing of FIG. 9.

Then, the aforementioned cover 51b is placed with the holder 52b of said cover 51b lining with the cylindrical anti-vibration bushing 40 and the flattened piece 56 in a corresponding position to the biting groove 57. When the joints 54, 55 are pressed by means of a press so that they come close to each other in order to close the mounting component for bushing, the tip of the flattened piece 56 abuts the bottom of the biting groove 57 before the receptacle 5a and the cover 51b of the portion for mounting a bushing 51 are closed, as shown in FIG. 11. When the joints 54, 55 are further pressed in this condition so that they are tightly attached, the flattened piece 56 is plastically deformed in a pressure-squeezed manner in conformance with the shape of the biting groove 57 as shown in FIG. 12. This causes the flattened piece 56 to be inserted into the biting groove 57 that includes an enlarged section 57a. The opposite sides of the joints 54, 45 come closer to each other in a direction of tight attachment, and both holders 52a, 52b of the receptacle 51a and the cover 51b become completely closed. At the same time, the inner circumference surface of the holders 52a, 52b of the portion for mounting a bushing 51 tightly attaches to the outer circumference surface of the cylindrical anti-vibration bushing 40, and thus the cylindrical anti-vibration bushing 40 becomes securely clamped.

Even when the pressure on the joints 54, 45 is released in this state, the flattened piece 56, which has been deformed and inserted into the biting groove 57, has bitten deeply enough into the enlarged section 57a of the biting groove to completely prevent the joints 54, 55, that is, the receptacle 51a and the cover 51b, from separating. In this manner the clamped and secured condition inside the holders 52a, 52b of the cylindrical anti-vibration bushing 40 is maintained.

While in this embodiment mode a biting groove 57 is provided at a receptacle 51a and a flattened piece 56 is formed at a cover 51b in a portion for mounting a bushing 51, it is possible to reverse the constitution so that a flattened piece is provided at the receptacle and a biting groove at the cover.

[Embodiment Mode 5]

Figure 13:
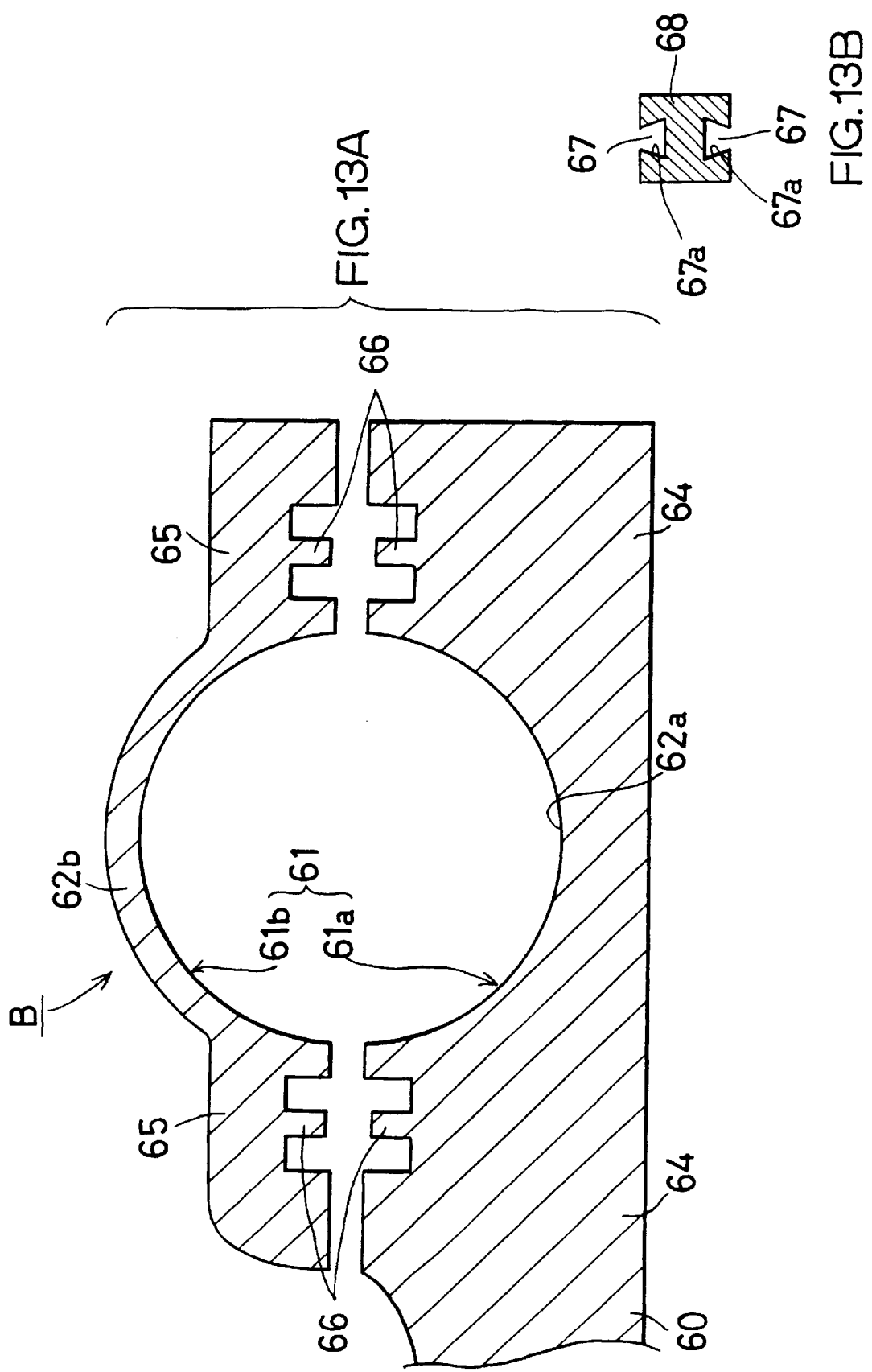
FIG. 13A is a lateral cross-sectional view of the component for mounting a bushing of the fifth embodiment mode of the present invention.
FIG. 13B is a lateral cross-sectional view of a coupling body.
Figure 14:
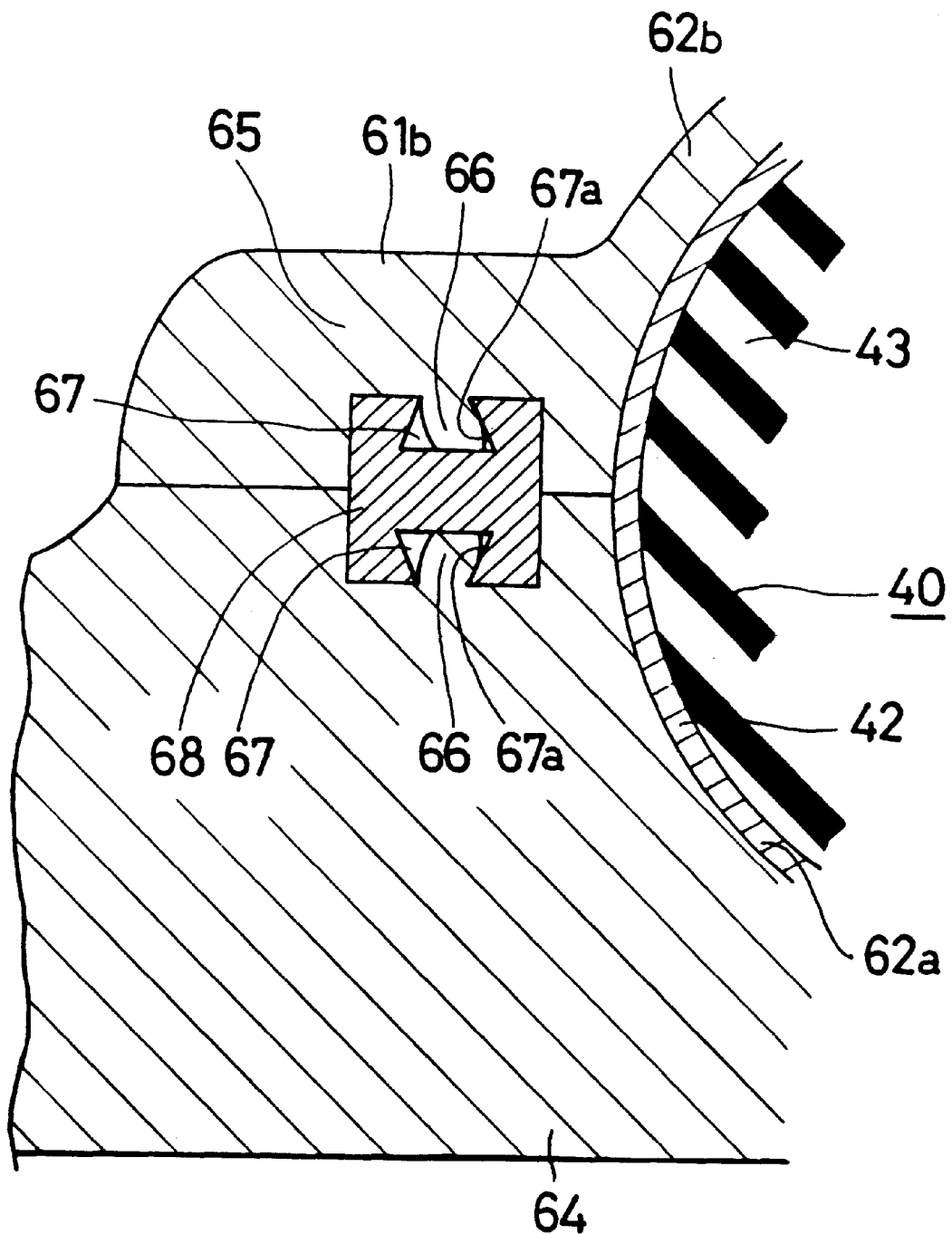
FIG. 14 is an enlarged lateral cross-sectional view that shows how the joints are connected at the portion for mounting a bushing when a cylindrical bushing is inserted into the component for mounting a bushing of FIG. 13A and FIG. 13B.

FIGS. 13 and 14 show the fifth embodiment mode of the present invention that is applied to an automobile suspension arm component B. This embodiment mode entails connecting the joints for a mounting component by means of a coupling body made of aluminum.

On the aforementioned suspension arm component B, portions for mounting a bushing 61 are formed on the two ends in the direction of length of a component body 60 whose overall configuration parallels that shown in FIGS. 9 through 12; its coupling structure of a receptacle 61a and a cover 61b of the portion for mounting a bushing is different from that of A.

The component for mounting a bushing B as the aforementioned automobile suspension arm component connects the joints 64, 65 of the portion for mounting a bushing 61 by means of a coupling body 68, and is comprised of five pieces: a component body 60 which integrated the receptacle 61a of the portion for mounting a bushing 61, two covers 61b, 61b that form portion for mounting a bushing 61 and two coupling bodies 68, 68. The aforementioned component body 60 is made by means of welding press. The aforementioned cover 61b and the coupling body 68 are made by cutting an aluminum extruded shaped material having the cross-section shape shown in FIGS. 13A and 13B into a specified length in an axial direction.

In the portion for mounting a bushing 61 shown in FIG. 13A, a receptacle 61a, cover 61b, holders 62a, 62b have the same constitution as A in FIGS. 9–12. On both open edges of each of the holders 62a, 62b, a pair of joints 64, 64, 65, 65 are formed, protruding on the outer circumference surface over the entire axial direction area. On each of the opposite sides of the joints 64, 65, a flattened piece 66 with a square cross section that extends in an axial direction is provided at the center part in a radial direction. On the other hand, 68 shown in FIG. 13B is a coupling body. Said coupling body 68 is formed with a rectangular cross section that has almost the same length and width as the opposite faces of the joints 64, 65. On the two sides of the coupling body 68 that face the aforementioned joints 64, 65, biting grooves 67 are formed extending in an axial direction in a position corresponding to the aforementioned flattened piece 66. The flattened piece 66 and the biting grooves 67 serve to couple the joints 64, 65 through the coupling body 68, and thus hold the holders 62a, 62b of the receptacle 61a and the cover 61b in a closed condition. This is done by packing the aforementioned flattened piece 66 into the biting grooves 67 by plastically deforming the former. For this purpose, the biting groove 67 contains an enlarged section 67a at the mid-point in the depth direction such that the width of the groove increases continuously (the area of the opening increases) in a dovetail groove manner from the top toward the bottom. On the other hand, the flattened piece 66 is set so that the height of its protrusion is greater than the depth of the biting groove 67. When the portion for mounting a bushing 61 is closed, the deformed and inserted flattened piece 66 bites into the aforementioned enlarged section 67a to strongly prevent the joints 64, 65 from separating. Moreover, the height of the coupling body 68 is set so that, when the component for mounting a bushing 61 is closed, the opposite sides of the coupling body 68 and the joints 64, 65 are tightly attached to each other.

The following explains how a bushing is maintained by the component for mounting a bushing B in this embodiment mode.

First, a cylindrical anti-vibration bushing 40 is inserted into a holder 62a of a receptacle 61a, while a cover 61b of the portion for mounting a bushing 61 is detached. Said coupling body 68 is placed so that the flattened piece 66 of the receptacle 61a is in a position corresponding to the biting groove 67 of the aforementioned coupling body 68.

Then, the cover 61b of the portion for mounting a bushing 61 is placed onto the receptacle 61a with its holder 62b lining with the cylindrical anti-vibration bushing 40 and the flattened piece 66 in a corresponding position to the biting groove 67. When the joints 64, 65 are pressed by means of a press and the like so that they come close to each other in order to close the component for mounting a bushing 61, each of the flattened pieces 66 of the joints is fitted into each of the biting grooves 67 of the coupling body 68, and the tip of the flattened piece 66 abuts the bottom of the biting groove 67. When the joints 64, 65 are further pressed in this condition so that they are tightly attached, the flattened piece 66 is plastically deformed in a pressure-squeezed manner and bites into an enlarged section 67a of the biting groove 67 as shown in FIG. 14. The opposite sides of the joints 64, 65 of the coupling body 68 come closer to each other in a direction of mounting a bushing 61 becomes completely closed. At the same time, the inner circumference surface of the holders 62a, 62b of the mounting component for bushing 61 tightly attaches to the outer circumference surface of the cylindrical anti-vibration bushing 40; thus the cylindrical anti-vibration bushing 40 becomes securely clamped.

Even when the pressure on the joints 64, 65 is released in this state, the flattened piece 66, which has been deformed and inserted into the biting groove 67, has bitten into the enlarged section 67a of the biting groove 67 to completely prevent the joints 64, 65 from separating. In this manner the clamped and secured condition inside the holders 62a, 62b of the bushing 40 is maintained.

This embodiment mode provides flattened pieces 66 in the joints 64, 65 and biting grooves 67 in the coupling body 68. However, alternatively biting grooves may be provided in the joints 64, 65 and flattened pieces in the coupling body 68. Also, a flattened piece may be provided in one joint, and a biting groove on the other joint, while corresponding biting groove and flattened piece are formed in the coupling body. Furthermore, the flattened piece 66 may be plastically deformed so that it completely fills the biting groove 67.

Although the fourth and fifth embodiment modes describe situations where biting grooves 57, 67 are provided over the entire axial direction of the mounting component for bushings 51, 61 as biting recesses into which flattened pieces 56 and 66 bite, it is not necessary that the biting grooves be provided over the entire axial direction of the mounting components for bushings 51, 61. Alternatively, biting recesses may be formed as one or more through or non-through biting hole (biting holes).

[Embodiment Mode 6]

Figure 15:
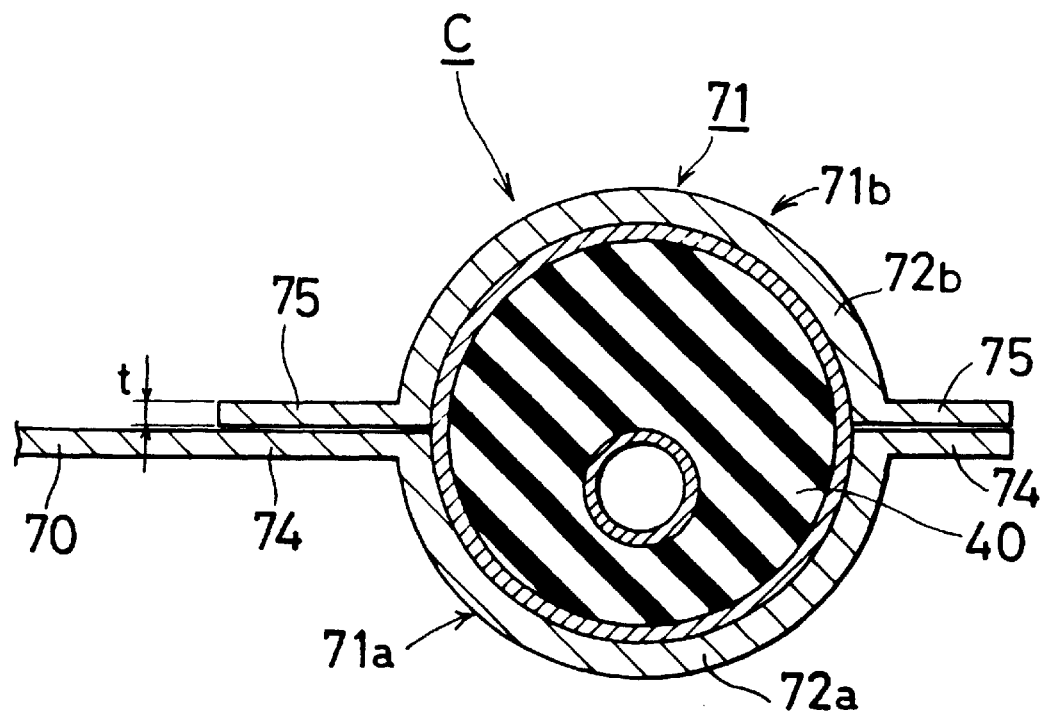
FIG. 15 shows the sixth embodiment mode of the present invention; it is a lateral cross-sectional view that shows the portion for mounting a bushing being closed after a cylindrical bushing is inserted into the component for mounting a bushing.
Figure 16:
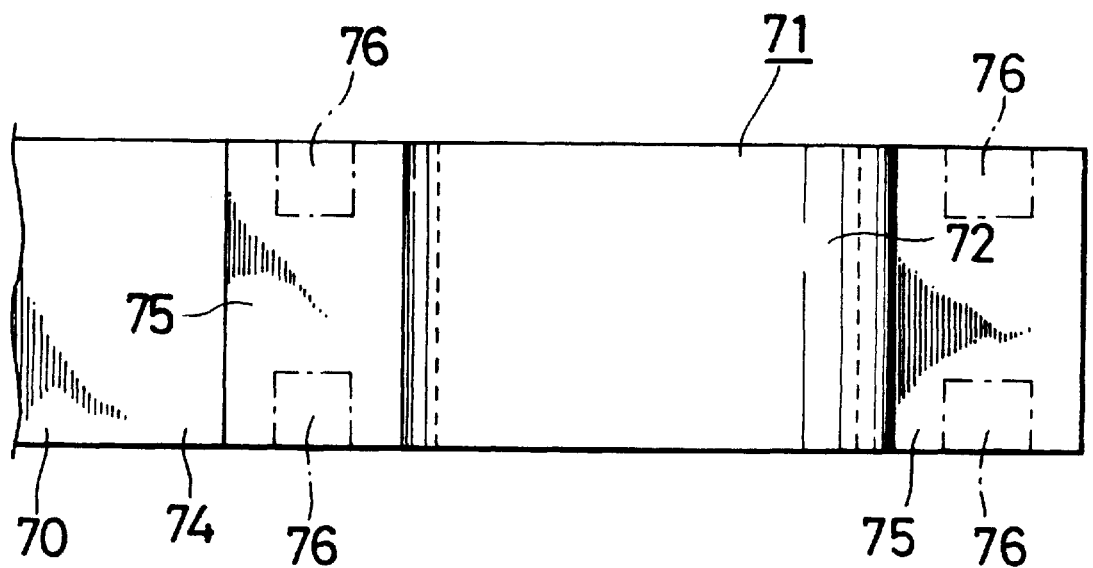
FIG. 16 is a planer view of FIG. 15.

FIGS. 15–17 show yet another embodiment mode of the present invention that is applied to automobile suspension arm components. This embodiment mode adopts shearing bonding as a bonding structure by means of the plastic deformation of the joints. The component for mounting a bushing C as an suspension arm component shown in these figures has an overall configuration similar to the what is described in the fourth embodiment mode as A; on this component for mounting a bushing, portions for mounting bushings 71 are formed on the two ends of a component body 70 in the direction of length, and is comprised of a component body 70 with which a receptacle 71a of a portion for mounting a bushing 71 is formed in an integrated manner and two covers 71b, 71b that form a portion for mounting a bushing 71. Each of the components is made by cutting an aluminum extruded shaped material having the partial cross-section shape shown in FIG. 15 into specified length in an axial direction.

In the aforementioned component for mounting a bushing 71, each of the receptacle 71a and the cover 71b has holders 72a, 72bcurved in a semicircular shape. In the aforementioned receptacle 71a and the cover 71b, relatively thin joints 74, 74, 75, 75 are provided on both open edges of each of the holders 72a, 72b, protruding outward in a radial direction of said holders 72a, 72b over the entire axial direction area.

In this portion for mounting a bushing 71, a cylindrical anti-vibration bushing 40 is inserted into a holder 72a of a receptacle 71a, while a cover 71b is detached. Then the cover 71b is placed with its holder 72b lining with the aforementioned cylindrical anti-vibration bushing 40, superimposing the joints 74, 75.

Figure 17A:
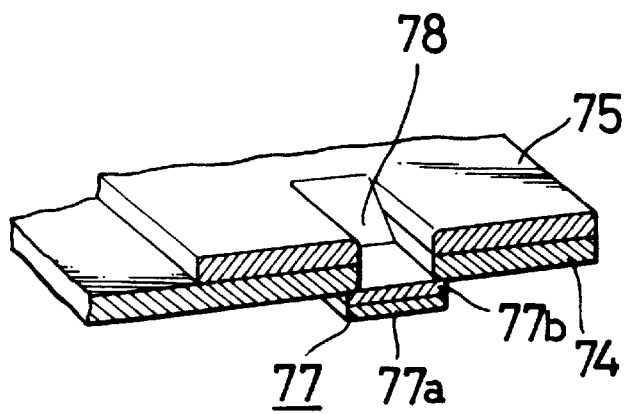
FIG. 17A is a perspective view that shows the plastic deformation of a joint of the component for mounting a bushing of FIG. 15 by a shearing force.
Figure 17C:
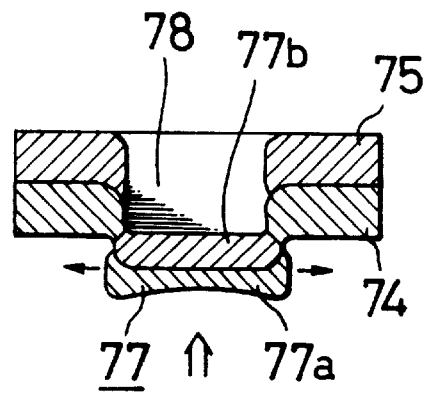
FIG. 17C is a lateral cross-sectional view that shows the area around the deformed part after the deformed part has been pressed.
Figure 17B:
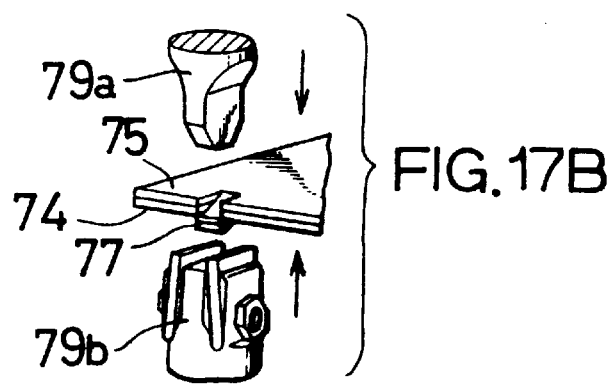
FIG. 17B is a perspective view that shows the condition of the deformed part after it is deformed and before it is pressed.

In the next step, the plastic deformation force in the direction of height, i.e., the shearing force, is applied to the site to be deformed 76 (indicated by the dotted line in FIG. 8) on the joints 74, 75 that are superimposed. This is shown in FIG. 17A. The deforming is performed so that, as shown in FIG. 17C, a part of the thickness of the joint 75 in the backward direction of the shearing force (the upper parts in FIGS. 15 and 17) will slightly remain in the sheared hole 78 that is created by the shearing operation. Subsequently, the deformed section 77 is pressed in the direction of thickness by means of a shearing punch 79a and an anvil 79b that is provided in the lower mold and the like, as shown in FIG. 17B. This increases the radial direction width of the joint 77b in the backward shearing direction (the upper Part) of the deformed section 77, as shown in FIG. 17C. This causes the deformed section to bite into the side wall of the shearing hole 78. On the other hand, the burr for the joint 77a in the forward shearing direction (the lower part) is increased in order to make the width in the radial direction larger than the width of the shearing hole 78 so that the joint will not be dislodged in a direction opposite the shearing direction. This increases the bounding force of the joints 74, 75 so that the cylindrical anti-vibration bushing 40 is securely clamped and locked in the holders 72a, 72b.

In such a sharing bonding structure, there are no particular restrictions on the size or position of the shearing deformed section 77. These factors, however, should be set so that enough bonding power is generated to prevent the occurrence of an gap between the joints. Furthermore, thickness t of the joints 74, 75 should be determined appropriately by taking the rigidity and the shearing load on the joints into consideration.

[Embodiment Mode 7]

Figure 18:
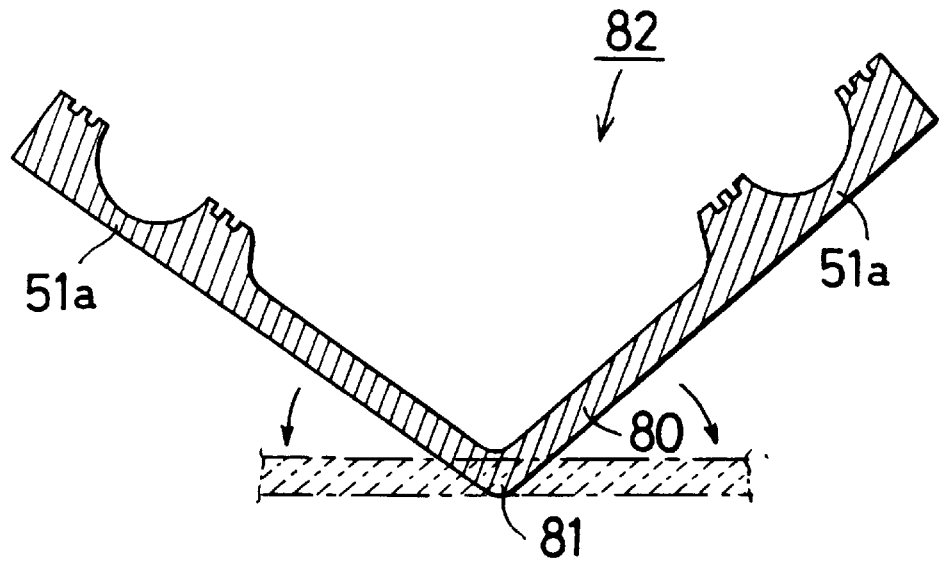
FIG. 18 shows the seventh embodiment mode of the present invention; it is a lateral cross-sectional view that shows a shaped material that possesses one corner on the piece itself; it also shows how the piece is expanded and processed.
Figure 19:
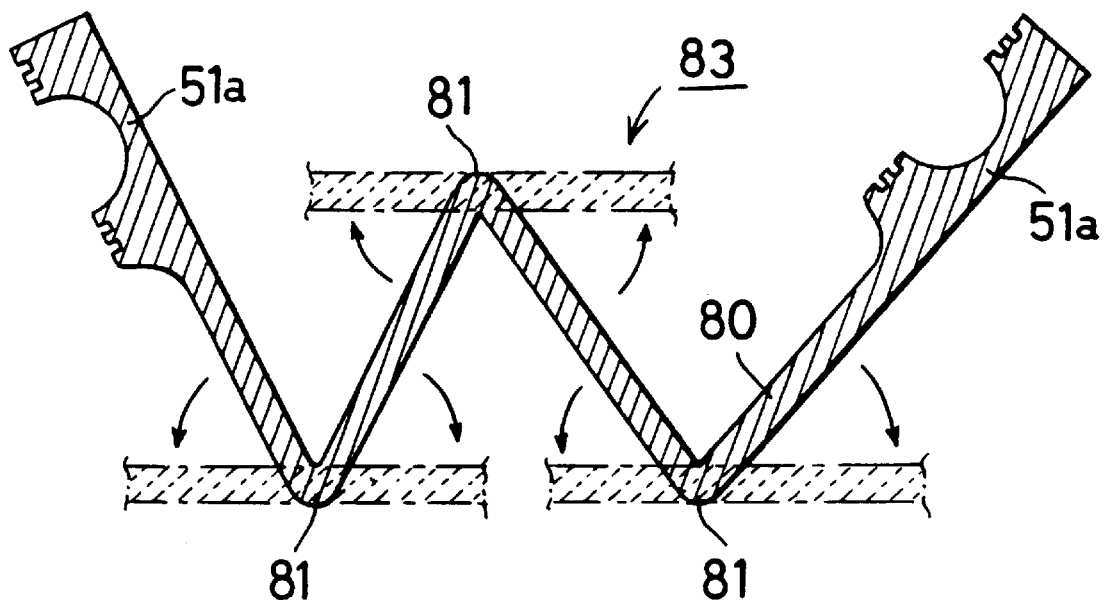
FIG. 19 shows the seventh embodiment mode of the present invention; it is a lateral cross-sectional view that shows a shaped material that possesses several corners on the piece itself; it also shows how the piece is expanded and processed.

In the present invention, when manufacturing a shaped material with a targeted cross sectional shape is difficult due to the dimensional limitation or the processing capacity of a processing device, a long component for mounting a bushing may be manufactured by a method which uses the following forming [lit: developing] process. In other words, first, as illustrated in FIGS. 18 and 19, make shaped components 82, 83 having one or a plurality of arc corner portions 81 in the cross sectional view [lit: shape] on the composite body. Then, form these shaped components 82, 83 so that the aforementioned corner portions 81 become straight line shape to obtain the targeted shape. The forming [lit: developing] process is not specifically limited and any publicly known technique such as the roll forming, press forming, and the drawing forming techniques may be applied at one's convenience. In addition, the forming [lit: developing] process not only forms [lit: develops] [materials] two dimensionally but also forms [lit:develops] [the materials] three dimensionally by twisting. In this way, formed shaped material provides a much longer component for mounting a bushing than what the processing device is capable of processing.

Also, the number of corners 81 on the aforementioned formed components 82, 83 is not specifically limited. The direction in which the cornered portion 81 is bent is not limited: as illustrated in FIG. 19, the cornered portions 81 which are next to each other may have alternate curving directions or all corners 81 may have the same curving directions consisting of multi-angles.

If an extruded shaped material is used as the aforementioned shaped material, it is preferable to do the forming after it is sliced to a prescribed thickness in an axial direction.

Furthermore, regardless of whether or not the mounting component for a bushing of the present invention has the type of joint structure for the mounting portion or employs the forming [developing] process, the mounting component for a bushing has the following common features:

First, the desirable material for the component for mounting a bushing of the present invention is aluminum; especially 6000 type aluminum is preferable for it has the tenacity required for automobile components and the good formability. The 6NO1-T5, 6NO1-T6, 6061-T6 are specially preferable. The manufacturing method for component bodies 50, 60, 70 in which receptacles 1a, 11a, 21a or receptacles 51a, 61a, 71a are integrated or for covers 1b, 11b, 21b, 51b, 61b, 71b is not specifically limited. Examples include: a method by which an extruded material of prescribed cross sectional shape is sliced, a method by means of welding press or die casting, and a method by which a holder, biting concave portion and flattened piece are formed on a roughly shaped material using embossed rolling. It is also possible to manufacture the component body 50, 60, 70 in which receptacles 1a, 11a, 21a or receptacles 51a, 61a, 71a are integrated and the covers 1b, 11b, 21b, 51b, 61b, 71b by different processing methods.

As for each of the dimensions for the mounting component for a cylindrical bushing, in the case of using it as an automobile engine mounting bracket for example, the diameter of the holder is preferably in the range of 30 to 100 mm, and the thickness 5 to 50 mm. When applying this [material] to a component for the use in a suspension arm, the total arm length L shown in FIG. 9 of 100 to 1700 mm is preferable, and 500 mm or more is specially preferable for the aforementioned forming process product as shown in the seventh embodiment mode. In addition, in a portion for mounting a bushing, the range of 30 to 100 mm is preferable for a diameter and 5 to 50 mm for the thickness.

When forming portions for mounting a bushing 51, 61, 71 on both ends of the aforementioned component bodies 50, 60, 70, the receptacles 51a, 61a, 71a that form the mounting portions for a bushing can be symmetrical on both ends (FIGS. 9 and 18) or non-symmetrical (FIG. 19). Also, the shape of the component bodies is not limited to a specific shape: they can be in any shape such as a bar or, for example, A-shape.

In addition, in a component for mounting a cylindrical bushing of the present invention, the thickness can be easily varied according to the tenacity required for each parts. In general, in the mounting component for bushing as such, stress concentrates on each of the aforementioned joints while relatively less stress concentrates on the holders. For example, in the mounting component for bushing 1 of the first embodiment mode, each of the joints 4, 5 of the receptacle 1a and the cover 1b is formed thicker than the holders 2a, 2b. Furthermore, after a cylindrical anti-vibration bushing 40 is fitted, two joints 4, 5 become twice as thick by superimposing, thus the stress concentration can be handled adequately. Also in long components for mounting a bushing in the fourth through the sixth embodiment modes A, B, C, stress concentrates on the connecting portions of component bodies 50, 60, 70 of each of the aforementioned mounting portions for bushings 51, 61, 71, while relatively less stress concentrates on the component bodies 50, 60, 70 themselves. For example in the component for mounting a bushing A of the fourth embodiment, the joint 54 at the receptacle 51a is made thicker than the component body 50 itself. Furthermore, by superposing the joint 55 of the cover 51b, the component-body joint after mounting the cylindrical anti-vibration bushing 40 will be more than twice thick than the component body 50, thus the stress concentration can be excellently handled thereon. On the other hand, when [the joint] is not required to have a relatively high tenacity, one may want to reduce weight as far as the required tenacity is maintained, by forming a hollow portion 50c in the shape of harmonica or truss as illustrated in the component body 50a, 50b in FIGS. 20A and 20B. In this case, if an extruded material is used as a component body 50a, 50b, a component body having a hollow portion 50c can be easily manufactured. In this way, by varying the thickness according to the level of tenacity required for each part, weight can be reduced while increasing tenacity for the bush-mounting component. Also, even when providing a forming [lit: developing] processing on the component body portion, by loyally forming corner portions only, one may reduce weight by manufacturing a component body having a hollow portion. Moreover, one may want to form a bolt hole on the component body portion for mounting assistance and the like.

It is also possible that one forms an enlarged section where the opening area increases toward the depth direction for the railcut recess (biting groove) in the first, second, fourth, and fifth embodiment modes such that the flattened piece is plastically deformed such that it cannot be dislodged; the shapes of these are concretely illustrated in the FIGS. 21A, 21B and 21C. FIG. 21A is shaped the same as the railcut recesses 7, 57 of the first and fourth embodiment modes: sides are curved and the enlarged section 7a having the largest opening area compared with the top and bottom ends, is formed in the middle, in the depth direction. Also, FIG. 21B shows the same shape as the railcut recesses 17, 67 of the second and the fifth embodiment modes: the groove width widens continuously from the top to the bottom in the depth direction (the opening area increases) like a cone [lit: an ant nest], forming an enlarged section 17a, 67a over the entire area in the depth direction. Furthermore, FIG. 21C illustrates the railcut recess 37 having a curved side surface; the groove width widens continuously from the top to the bottom in the depth direction, forming an enlarged section 37a over the entire area in the depth direction.

The flattened piece does not always need to have an enlarged section in the depth direction, but rather, as illustrated in FIG. 22A, the railcut recess 47 can be straight in the depth direction providing the same groove width [for any area]; or as illustrated in FIG. 22B, its angle θ can be slanted by 30 degrees or less with respect to the depth direction, increasing the bonding force between the railcut recess and the flattened piece.

To ensure the status in which [the flattened piece] cannot be dislodged after bonding, one may want to finish the cross sectional shape of the rail cut recess and flattened piece in the aforementioned manner. Also, one may want to simply increase the depth of the railcut recess and the thickness of the flattened piece, or to increase the number of [railcut recesses and flattened pieces] to obtain an effective biting [lit: effectively obtain the status in which it cannot be dislodged].

Furthermore, in the aforementioned joint, forming two or more railcut recesses in the thickness direction of the joint and with increased space between them may provide the effective biting with respect to the stress in the twisting direction.

In the third and sixth embodiment modes, by increasing the number or area of deformed sections 27, 77, or by increasing the space between the deformed sections, the same biting status as the aforementioned first, second, fourth and fifth embodiment modes can be obtained.

Also, the tightening degree δ for the aforementioned holders 2a, 2b, 12a, 12b, 22a, 22b 52a, 52b, 62a, 62b, 72a, 72b is represented by the equation δ=d−D, calculated based on the outer diameter d for the cylindrical anti-vibration bushing 40, and the inner circumferences D for the holders 2*a*, 2*b*, 12*a*, 12*b*, 22*a*, 22*b*, 52*a*, 52*b*, 62*a*, 62*b*, 72*a*, 72*b*. 0 to 5 mm is preferable for the aforementioned tightening degree δ. At less than 0 mm, that is, when d<D, there is a space between the cylindrical anti-vibration bushing 40 and the holders 2*a*, 2*b*, and the cylindrical anti-vibration bushing 40 cannot be held within the holders 22*a*, 2*b*. At longer than 5 mm, no matter how hard the joints 4, 5, 14, 15, 24, 25, 54, 55, 64, 65, 74, 75 are plastically deformed, it becomes difficult to completely close the receptacles 1*a*, 1*a*, 21*a*, 51*a*, 61*a*, 71*a* and the cover 1*b*, 11*b*, 21*b*, 51*b*, 61*b*, 71*b* to fill the flattened pieces 6, 16, 56, 66 into the railcut recesses 7, 17, 57, 67. It also becomes difficult to adequately enlarge the width of the joints 27*a*, 27*b*, 77*a*, 77*b* at the deformed portions 27, 77, and the bonding force is weakened. The especially preferable lowest limit to the tightening degree δ is 0.05 mm, the highest limit is 1.0 mm.

Also, in the first, second, fourth, and fifth embodiment modes, the flattened pieces 6, 16, 56, 66 are not necessarily filled in the railcut recess 7, 17, 57, 67 entirely; rather, they can be in a state in which the flattened pieces 6, 16, 56, 66 are plastically deformed and bite the enlarged sections 7*a*, 17*a*, 57*a*, 67*a* in the biting grooves 7, 17, 57, 67 so that the flattened pieces 6, 16, 56, 66 are prevented from being withdrawn. However, if there is a space between the joints 4, 5, 14, 15, 54, 55, 64, 65 after mounting and fixing a cylindrical anti-vibration bushing 40, dirt and water may come in from the space to cause corrosion, and it may deteriorate the strength of mounting component for bushing. For this reason, it is preferable to make the shape of the joints 4, 5, 14, 15, 54, 55, 64, 65 such that it eliminates the space after coupling as much as possible, and to further reduce the space by plastic deformation. Since dirt and water gradually enter even from a minute space, it is preferable that the interfaces of 4, 5, 14, 15, 54, 55, 64, 65 are soldered by, for example, a laser welding or a friction welding, or they are adhered by adhesive such as sealant, lock tight and the like, in order to completely seal the space. A friction welding may be carried out by pressing a rotating body that is harder than the raw material of the component for mounting a bushing against the interfaces of the joints 4, 5, 14, 15, 54, 55, 64, 65, thereby softening the interfaces of the joints by the generated friction heat. Also in the third and sixth embodiment modes, by soldering or adhering the space between the joints 24, 25, 74, 75 of the deformed sections 27, 77, the invasion of dirt and water can be more surely prevented.

Figure 23:
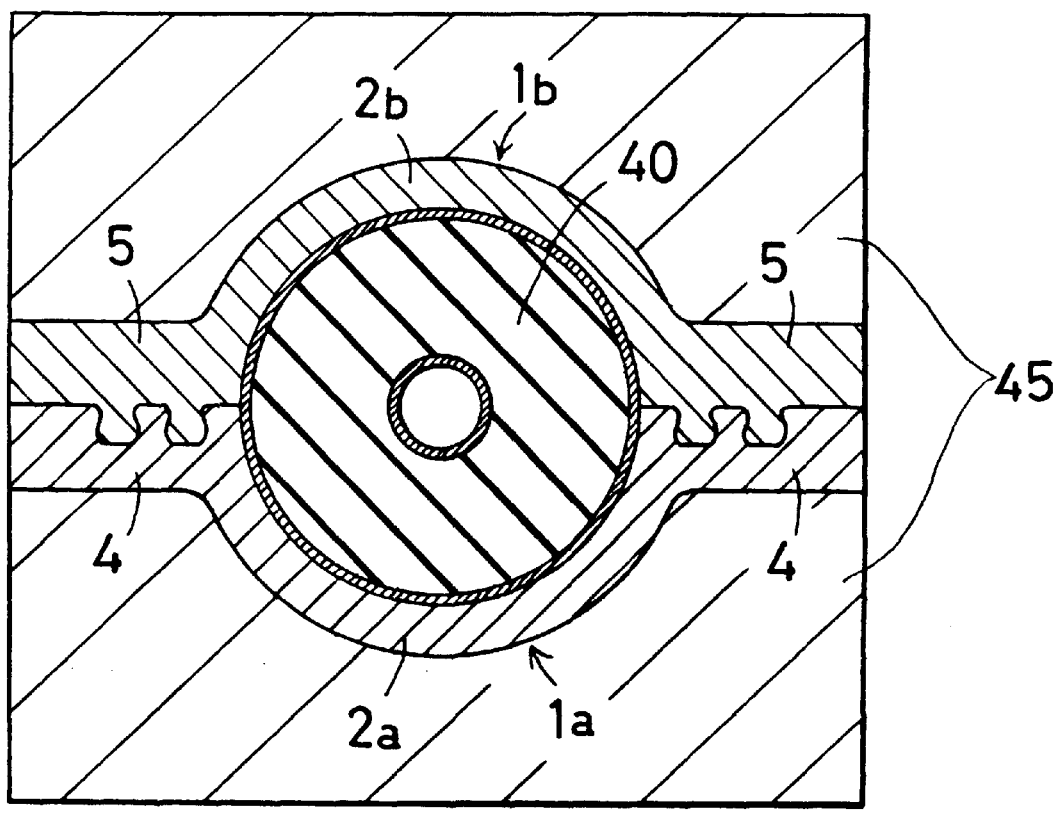
FIG. 23 is a lateral cross-sectional view that shows how the component for mounting a bushing of the present invention and the cylindrical bushing are fastened.
Figure 24:
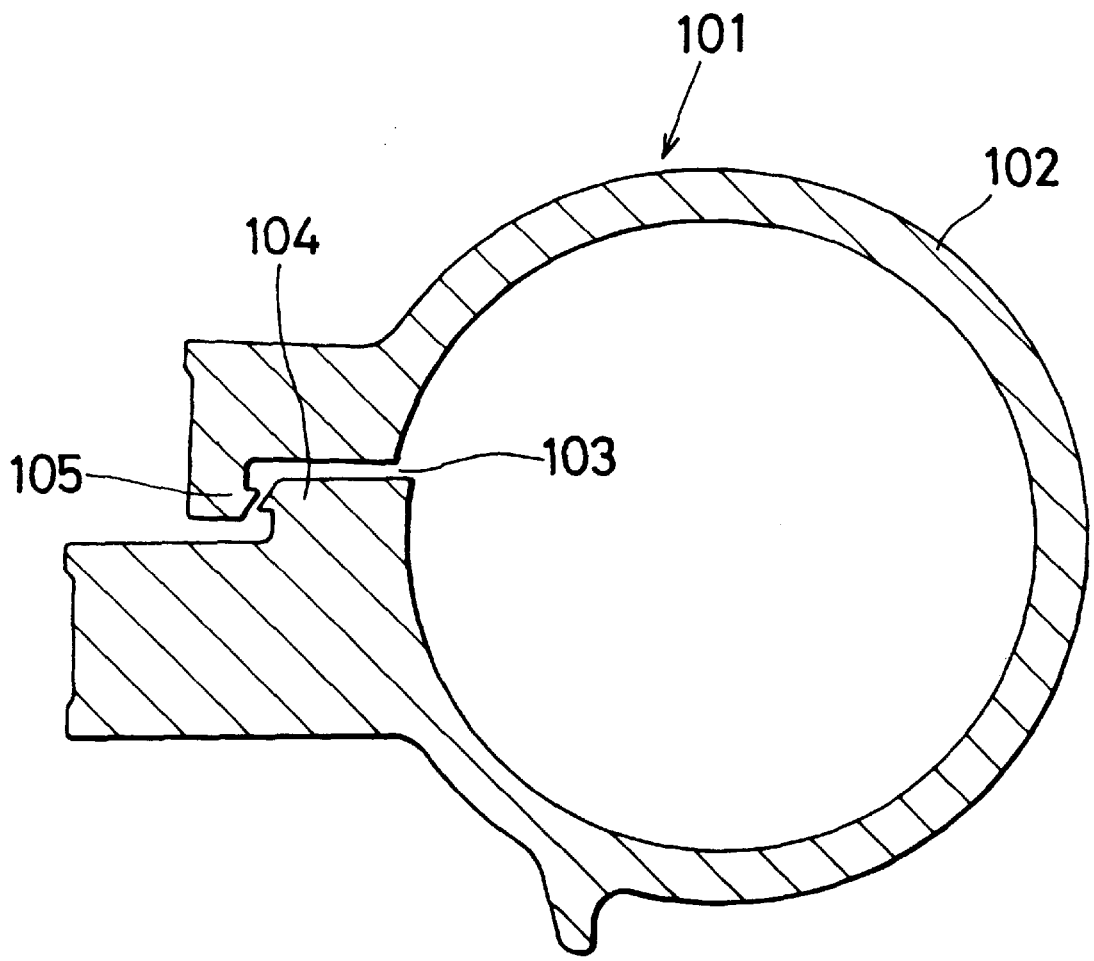
FIG. 24 is a vertical cross-sectional view of the coupling structure of a mounting component for bushing of the related art.

Further, when fastening the receptacle 1*a*, 11*a*, 51*a*, 61*a* and the cover 1*b*, 11*b*, 51*b*, 61*b* of the aforementioned component for mounting a bushing 1, 11, A, B, only the joints 4, 5, 14, 15, 54, 55, 64, 65, protruding outside the holders 2*a*, 2*b*, 12*a*, 12*b*, 52*a*, 52*b*, 62*a*, 62*b*, may be pressed. However, if pressed in a condition in which the entire outer surface is bound by employing a pair of jigs that touch the entire surface of the holders 2*a*, 2*b* and the joints 4, 5 as shown in FIG. 23, it is possible to control the deformation of the holders 2*a*, 2*b* as well as the cylindrical anti-vibration bushing 40. FIG. 23 illustrates fastening of the component for mounting a bushing 1 in the first embodiment mode.

Moreover, in each of the first through sixth embodiment modes, a solid type is used for cylindrical anti-vibration bushing 40, fixed by component for mounting a bushing 1, 11, 21, A, B, C and in which the journal 41 located in the center and the cylindrical rigid sleeve 42 provided in the circumference of the journal are connected by the rubber elastic body 43 which is inserted therebetween. However, another type may be used for the bushing, in which the rigid outer sleeve 42 is not used, but a liquid is enclosed inside the rubber elastic body 43 from the inlet provided on the outer circumference surface, and an anti-vibration function is obtained with the enclosed liquid. In this case, if the joining operation by press is carried out in the liquid for the joints 4, 5, 14, 15, 24, 25, 54, 55, 64, 65,74,75, enclosing the liquid into the rubber elastic body and joining the joints are carried out simultaneously, thus simplifying the process.

According to the above mentioned description, the present invention is a clamping-type mounting component for a cylindrical bushing, comprising of a receptacle and a cover that is separate from the receptacle, and the cylindrical bushing is fitted and clamped between them. Therefore, compared to a press-fitted type in which the bushing is press-fitted into the holder of the mounting component, it does not require the precise measurement of the distance between the bushing and the mounting component, and a special process is not needed for finishing the inner circumference surface of the holder of the mounting component in a required dimension.

In addition, the aforementioned receptacle is comprised of a holder that is hollow with an arcuate cross section such that it holds the aforementioned cylindrical anti-vibration bushing and two protruding joints are provided on said holder. The aforementioned cover is comprised of a holder that is hollow with an arcuate cross section such that it holds the aforementioned cylindrical anti-vibration bushing. Also, protruding joints corresponding to the joints of the aforementioned receptacle are provided on said holder. A cylindrical bushing is inserted into the holder of the aforementioned receptacle and the aforementioned cover is placed with its holder lining with the cylindrical bushing, thus the aforementioned corresponding joints are coupled by means of a coupling structure that uses a plastic deformation. In this way both holders are maintained in a closed state and the cylindrical bushing is clamped. Therefore, even when there are errors in shape and dimension of the joints, the joints may be plastically deformed to cancel the errors. For this reason, the precise measurement of dimension becomes unnecessary, thus facilitating the process for the coupling parts.

In addition, since it is a clamping type made of a plurality of separate components, deformation at the time of fastening the cylindrical bushing may also be controlled.

Further, in the aforementioned portion for mounting a bushing, one of the joints is provided with a flattened piece that protrudes toward the other joint, wherein on a railcut recess having an expanding section, the opening area of which increases in the depth direction, is formed at the position on the other joint that corresponds to the flattened piece, and wherein the joints are coupled when the flattened piece is inserted into the railcut recess and when the flattened piece is plastically deformed in such a way that it bites into the expanding section so that it cannot be withdrawn. Since the joints may be directly connected, the assembly operation can be effectively done and a strong tenacity can be obtained for the joint.

Furthermore, either a flattened piece or a railcut recess is created in each joint of the aforementioned portion for mounting a bushing; wherein a coupling device is placed between the joints, such that on the coupling device either a railcut recess is created in correspondence to the flattened piece on the joint or a flattened piece is created in correspondence to the railcut recess on the joint; such that the joints are connected by means of the coupling body either when the flattened piece of the one joint is inserted into the railcut recess of the coupling body and is plastically deformed in such a way that the flattened piece bites into the enlarged section so that it cannot be withdrawn or when the flattened piece of the coupling body is inserted into the railcut recess of the joint and is plastically deformed in such a way that the flattened piece bites into the expanding section so that it cannot be withdrawn. In this case, even when there are errors in dimension for the railcut recess or flattened piece provided for each joint, the errors can be canceled by adjusting the position of the railcut recess or the flattened piece provided for the joints, thus obtaining the effect that the precise measurement of the dimension for the mounting component may be less necessary.

Moreover, when the joints of the aforementioned portion for mounting a bushing are bonded in a superimposed condition such that a part of the joints is deformed in a shearing direction, the joints do not need to be provided with a railcut recess or a flattened piece. Therefore, the cross sectional shape of the joints can be made simple and its thickness thin, simplifying the manufacture of the mounting component and reducing the materials used, and thus providing an advantage in reducing the manufacturing cost.

Furthermore, by forming the aforementioned component for mounting a bushing by cutting an extruded shaped material of aluminum or its alloy to a prescribed thickness in an extruded direction, weight of the component may be reduced and the productivity may be increased. In addition, since the portion for mounting a bushing is made of a plurality of separate components, each component is more linear and simpler in shape compared to the single clamping-type component; thus it is extruded and manufactured easily.

Furthermore, by using one that has at least one arc-shaped or V-shaped curved corner in its cross section as the aforementioned extruded shaped material, such that the mounting component for bushing is made by cutting the extruded shaped material to a prescribed thickness in an extruded direction, and then forming it so that the aforementioned corner becomes linear shaped, it is possible to manufacture a component for mounting a bushing that is longer than what a machining device for manufacturing an extruded material is capable of. This makes it possible to fabricate long mounting components without welding.

Mounting body for a bushing in the present invention is a cylindrical bushing clamped in a component for mounting a bushing described as such; therefore it has every effect of the aforementioned component for mounting a bushing.

Also in the aforementioned body for mounting a bushing, if the space between the joints of the mounting body for a bushing is sealed by welding or an adhesive, while the joints of the portion for mounting a bushing is maintained in a closed condition, dirt or water may be prevented from entering, so that corrosion or lowering of the tenacity due to the corrosion of the mounting body for a bushing may be prevented.

The terms and expressions used herein are intended for the purpose of explanation and are therefore not to be considered restrictive; it should be understood that they do not exclude any equivalent of the characteristics illustrated or stated herein, and that all variations within the claims for the present invention are embraced therein.

What is claimed is:

1. A mounting body, comprising:

a cylindrical bushing; and a mounting component, said mounting component being comprised of a mounting portion for mounting said cylindrical bushing, wherein said mounting portion includes a receptacle and a cover that is separate from said receptacle, wherein said receptacle has a holder portion with an arcuate cross section for fitting said cylindrical bushing and two joint portions protruding from said holder portion, wherein said cover has a holder portion with an arcuate cross section for fitting said cylindrical bushing and joint portions protruding from said holder portion and corresponding to said joint portions of said receptacle, wherein said corresponding joint portions include locking portions for securing said corresponding joint portions together, wherein said cover is placed on said receptacle such that said cylindrical bushing is fitted between and held by said holder portion of said receptacle and said holder portion of said cover with said corresponding joint portions being in a superimposed state, and wherein said superimposed joint portions are secured together by plastically deforming at least one of said locking portions by applying a compression stress in the superimposed direction of said joint portions so that said at least one of said locking portions is flattened to be engaged with the other of said locking portions, whereby said holder portions are maintained in a closed state and said cylindrical bushing is clamped by said holder portions.

2. The mounting body as recited in claim 1, wherein either one of said joint portions is provided with a flattened piece that protrudes toward the other joint portion, wherein a railcut recess having an enlarged section, the opening area of which increase as its depth increases, is formed on the other joint at the position that corresponds to said flattened piece, and wherein said joint portions are coupled when said flattened piece is inserted into said railcut recess and when said flattened piece is plastically deformed in such a way that it bites into the expanding section so that it cannot be dislodged.

3. The mounting body as recited in claim 1, wherein said mounting component is formed by extruding and cutting aluminum or an aluminum alloy.

4. The mounting body as recited in claim 1, wherein the gap between said joint portions are sealed by means of welding or a bonding agent.

* * * * *